(12) United States Patent
Youn et al.

(10) Patent No.: US 10,716,083 B2
(45) Date of Patent: Jul. 14, 2020

(54) TRACKING AREA ASSIGNMENT METHOD IN WIRELESS COMMUNICATION SYSTEM AND DEVICE THEREFOR

(71) Applicant: LG Electronics Inc., Seoul (KR)

(72) Inventors: Myungjune Youn, Seoul (KR); Jaehyun Kim, Seoul (KR); Hyunsook Kim, Seoul (KR); Jinsook Ryu, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/469,503

(22) PCT Filed: Dec. 12, 2017

(86) PCT No.: PCT/KR2017/014544
§ 371 (c)(1),
(2) Date: Jun. 13, 2019

(87) PCT Pub. No.: WO2018/110939
PCT Pub. Date: Jun. 21, 2018

(65) Prior Publication Data
US 2020/0145953 A1 May 7, 2020

Related U.S. Application Data

(60) Provisional application No. 62/434,436, filed on Dec. 15, 2016, provisional application No. 62/505,039, filed on May 11, 2017.

(51) Int. Cl.
H04W 60/04 (2009.01)
H04W 36/00 (2009.01)

(52) U.S. Cl.
CPC ....... H04W 60/04 (2013.01); H04W 36/0016 (2013.01); H04W 36/0027 (2013.01)

(58) Field of Classification Search
None
See application file for complete search history.

(56) References Cited

U.S. PATENT DOCUMENTS

2016/0037411 A1* 2/2016 Franklin ............... H04W 36/24
370/331
2020/0053615 A1* 2/2020 Chiba ............... H04W 36/0016

OTHER PUBLICATIONS

S2-167225_was_7181_was 7124_was_6330-Local_area_network Nov. 14, 2016 (Year: 2016).*

(Continued)

Primary Examiner — Ernest G Tacsik
(74) Attorney, Agent, or Firm — Dentons US LLP

(57) ABSTRACT

Provided is a tracking area assignment method by an access and mobility management function (AMF) in a wireless communication system. The method may include receiving, from a session management function (SMF), service and session continuity (SSC) mode indication information for a protocol data unit (PDU) session generated for a user equipment (UE), obtaining serving area information for a serving area of a serving user plane function (UPF) associated with the PDU session, determining the assignment of a new tracking area to the UE is necessary based on a tracking area pre-assigned to the UE and the serving area, and performing tracking area update for the assignment of the new tracking area to the UE if it is determined that the assignment of the new tracking area is necessary.

15 Claims, 17 Drawing Sheets

(56) References Cited

OTHER PUBLICATIONS

LG Electronics, "Interim Agreement on SSC," S2-166480, SA WG2 Meeting #S2-118, Reno, Nevada, USA, Nov. 8, 2016, see sections 8.4, 8.6.
Kddi et al., "Proposal of Additional Interim Agreements on Session Management," S2-167181, SA WG2 Meeting #S2-118, Reno, Nevada, USA, Nov. 21, 2016, see section 1.
Huawei et al., "Evaluation of Solution 6.3.27 for Multiple Level Tracking Area Handling," S2-166436, SA WG2 Meeting #S2-117, Reno, Nevada, USA, Nov. 8, 2016, see sections 6.3.27.1-6.3.27.3.
Kddi et al., "Proposal of Additional Interim Agreements on Session Management," S2-166330, SA WG2 Meeting #S2-118, Reno, Nevada, USA, Nov. 8, 2016, see sections 1, 8.4.
Kddi et al., "Proposal of Additional Interim Agreements on Session Management," S2-167124, SA WG2 Meeting #S2-118, Reno, Nevada, USA, Nov. 21, 2016, see sections 1, 8.4.

* cited by examiner

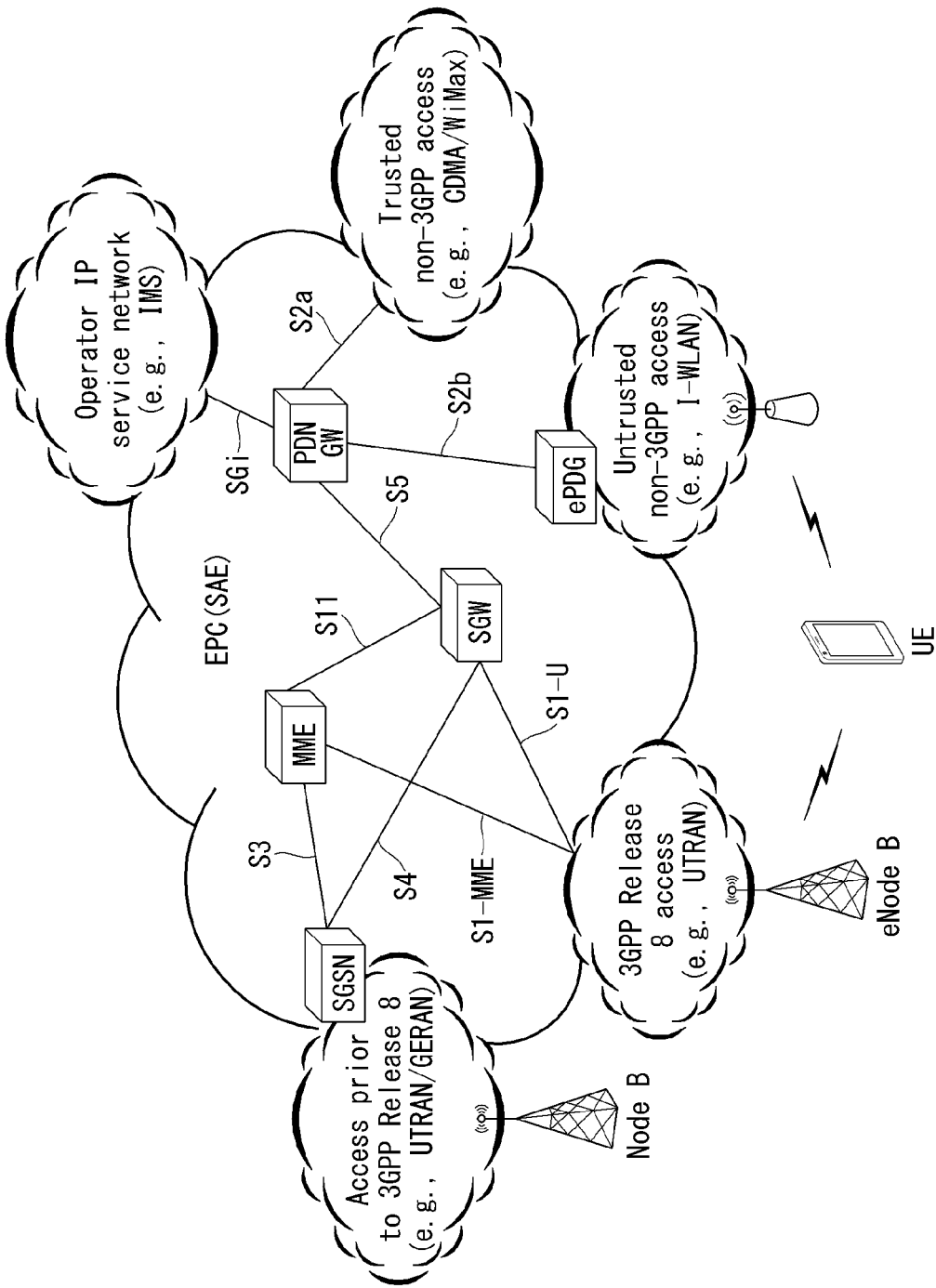
[FIG. 1]
PRIOR ART

[FIG. 2]
PRIOR ART
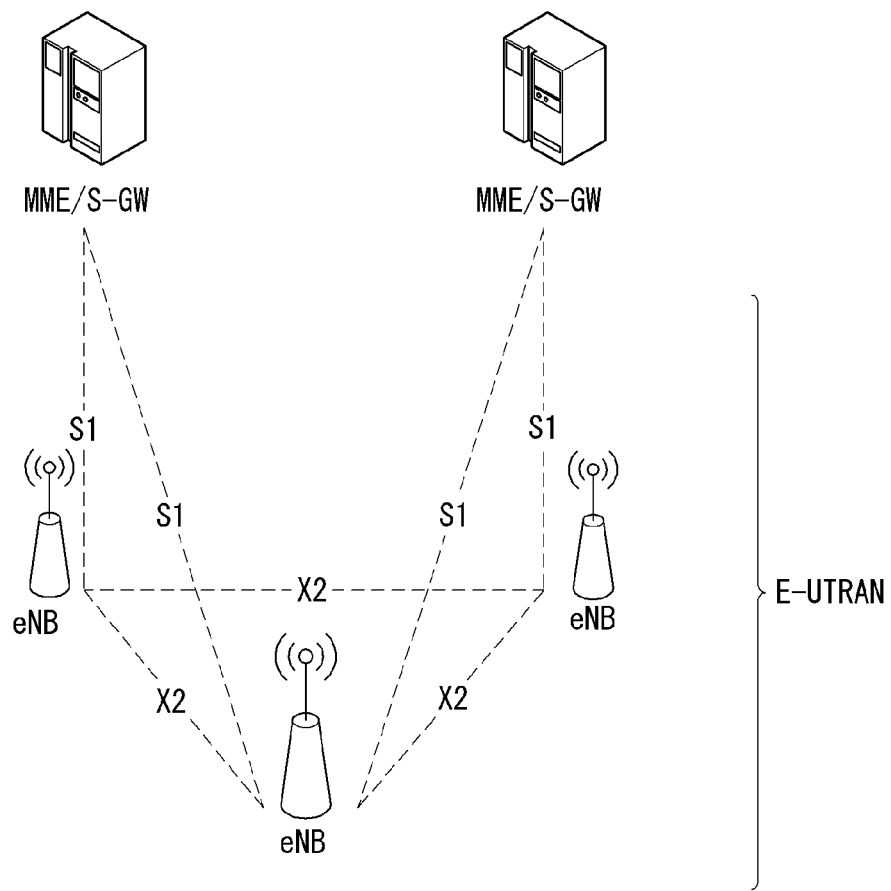

[FIG. 3]
PRIOR ART
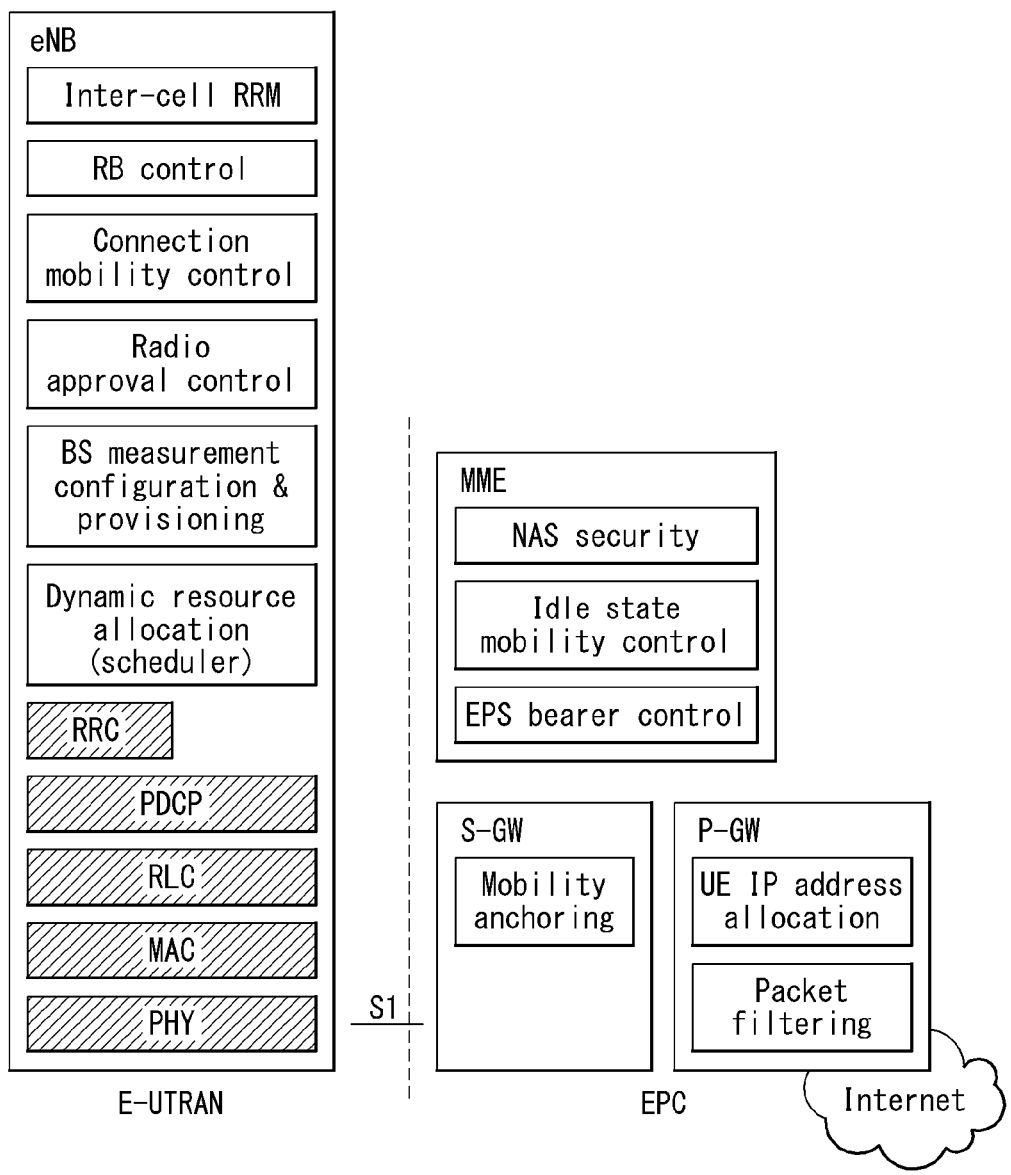

[FIG. 4]
PRIOR ART
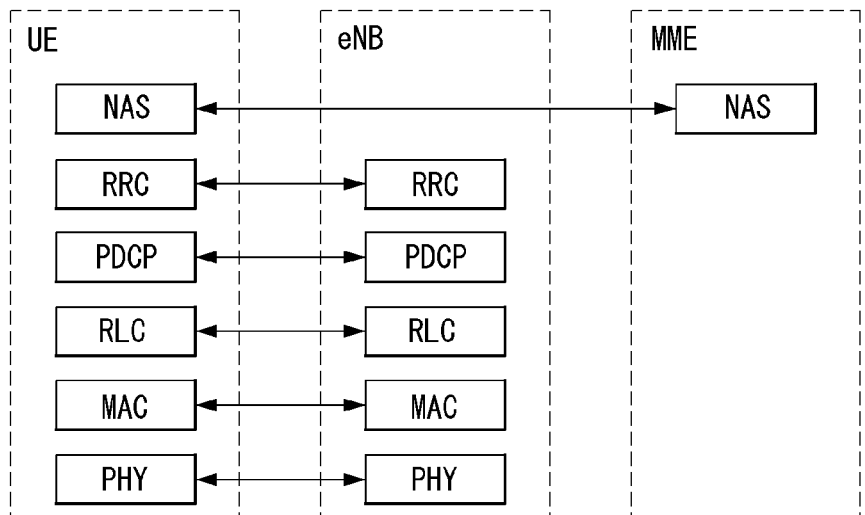
(a) Control plane protocol stack
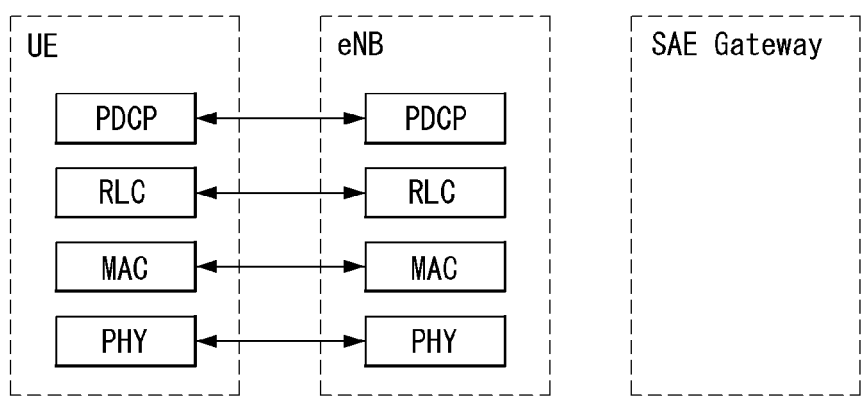
(b) User plane protocol stack

[FIG. 5]
PRIOR ART
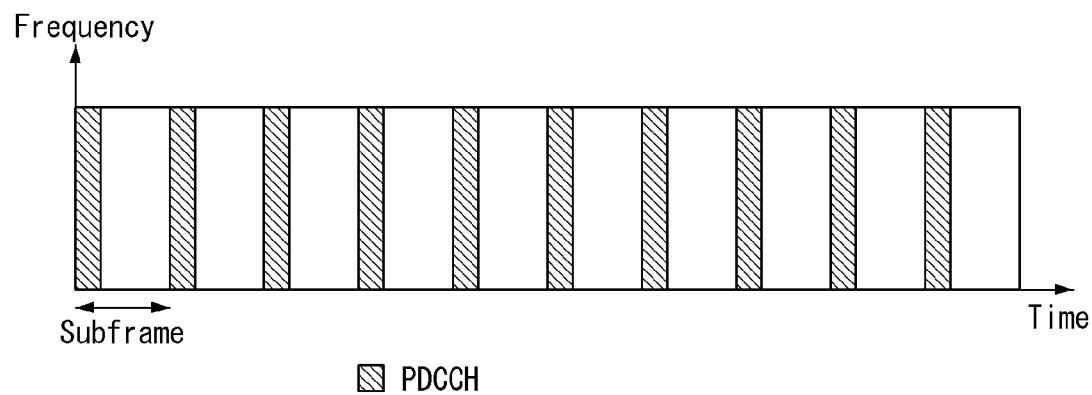
[FIG. 6]
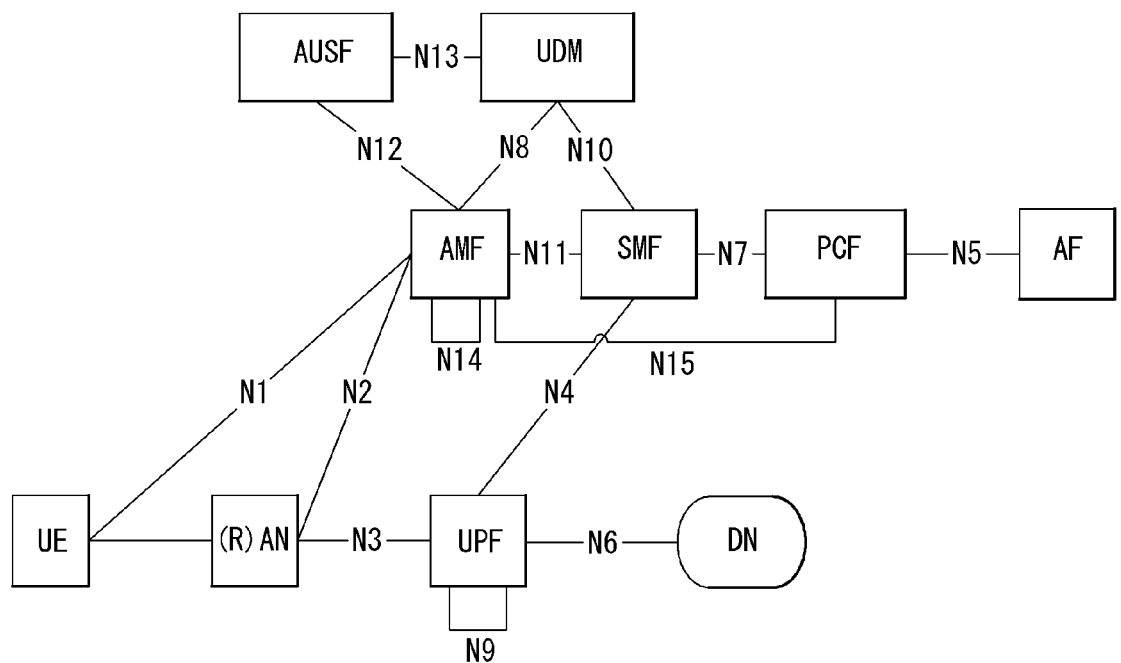

[FIG. 7]
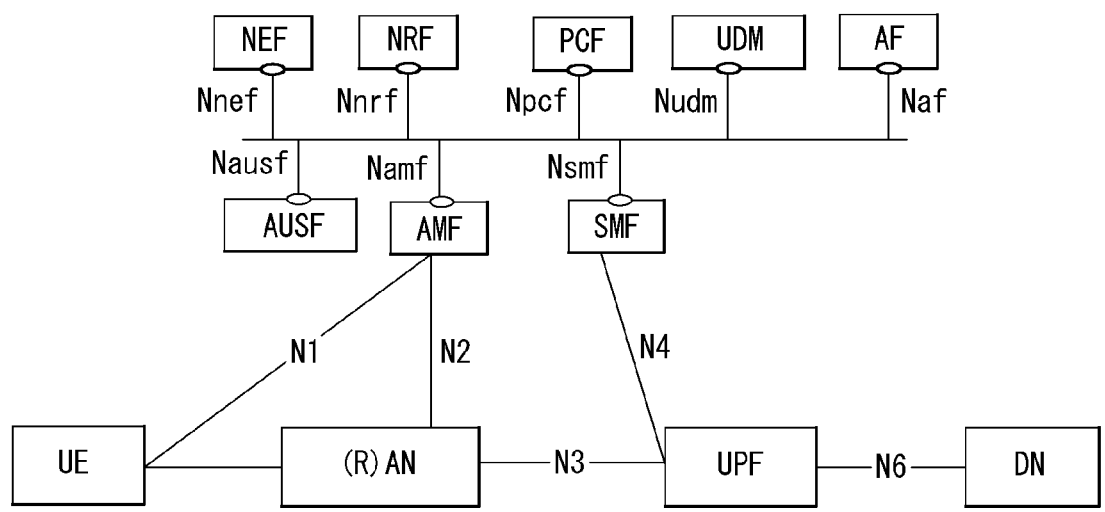

[FIG. 8]
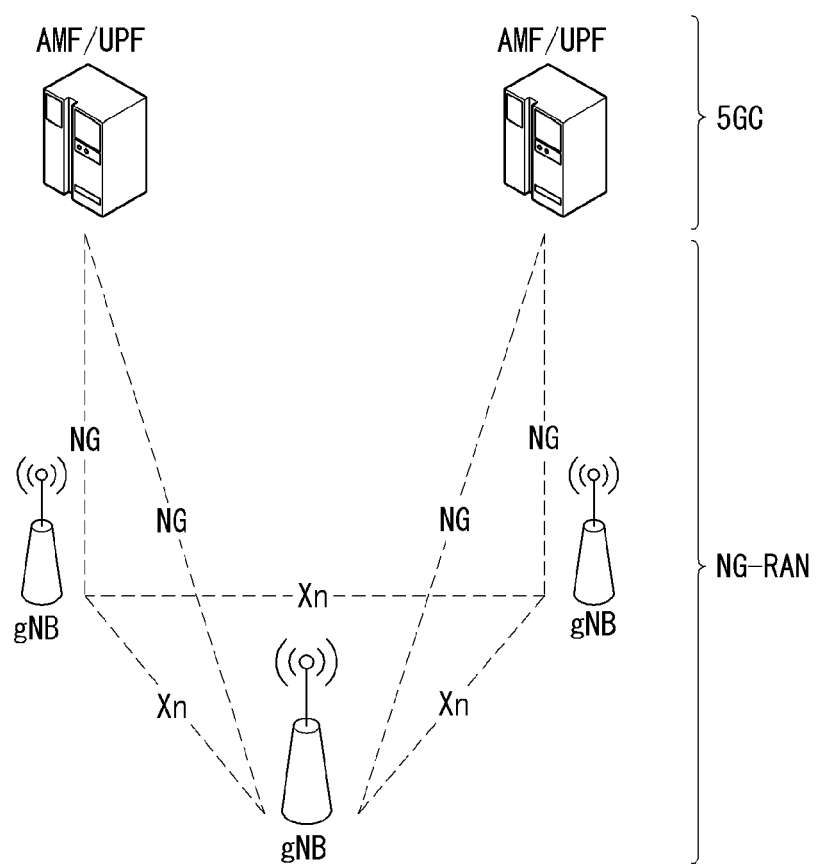

[FIG. 9]
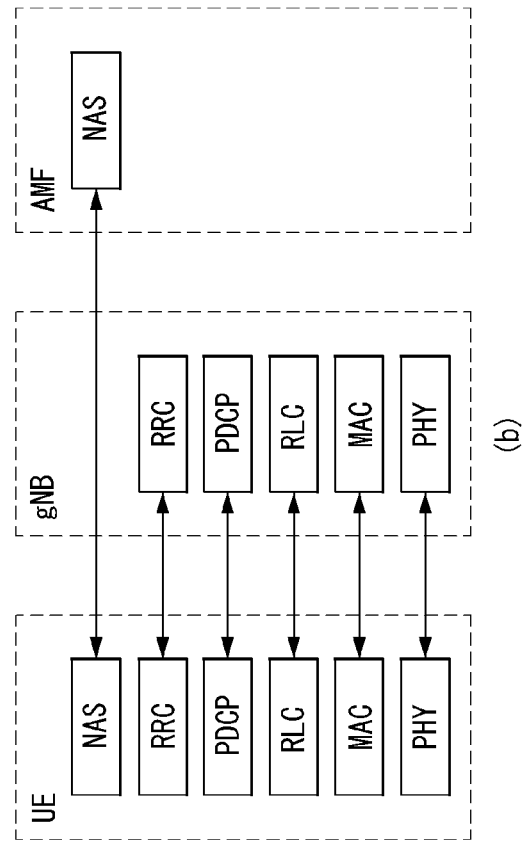
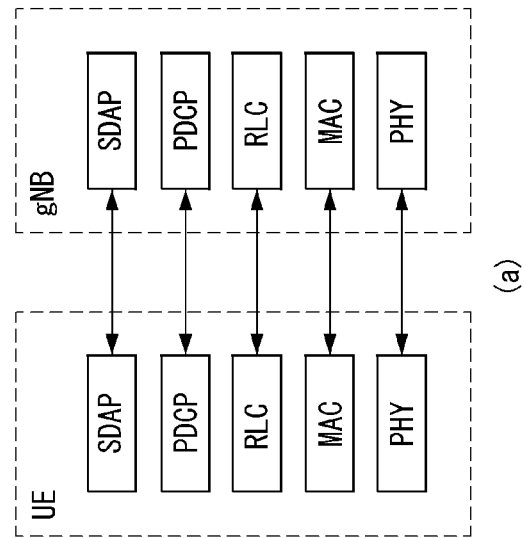

[FIG. 10]
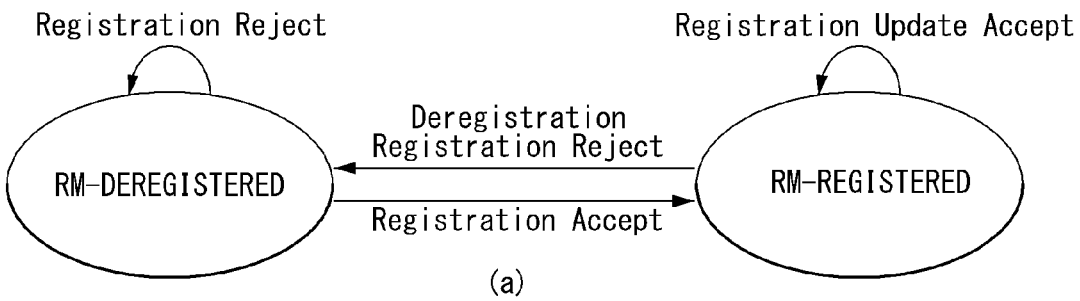
(a)
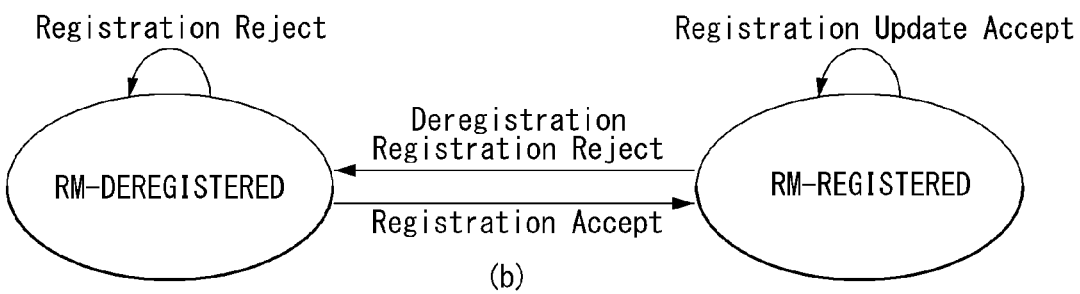
(b)
[FIG. 11]
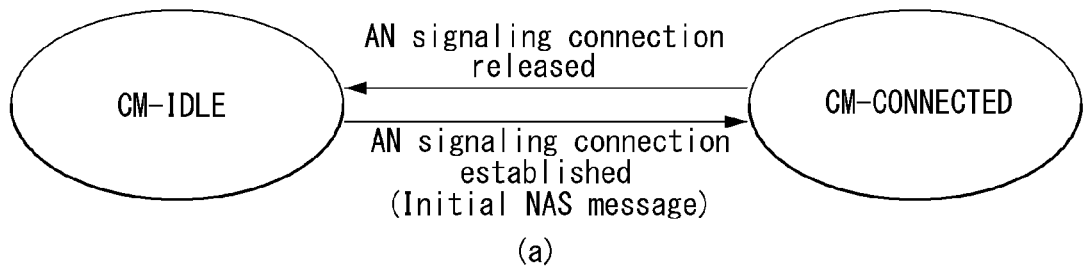
(a)
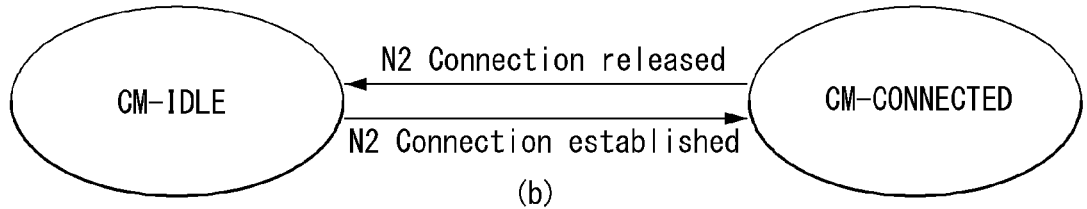
(b)

[FIG. 12]
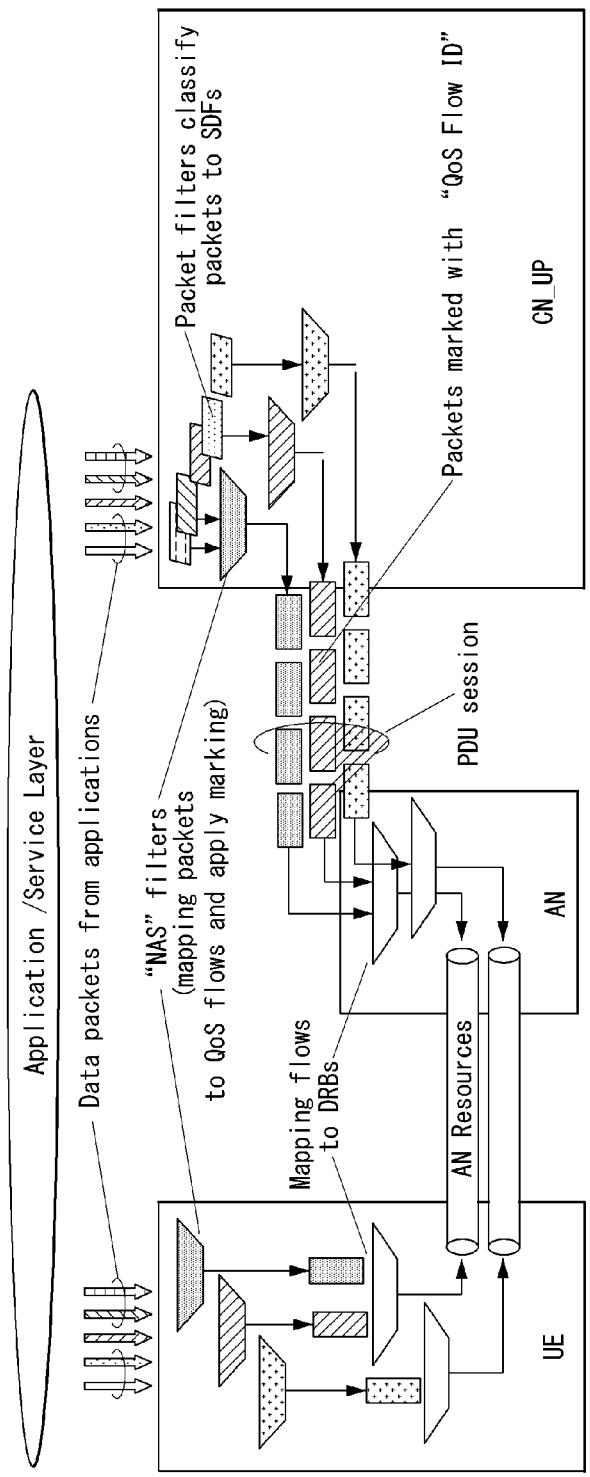

[FIG. 13]
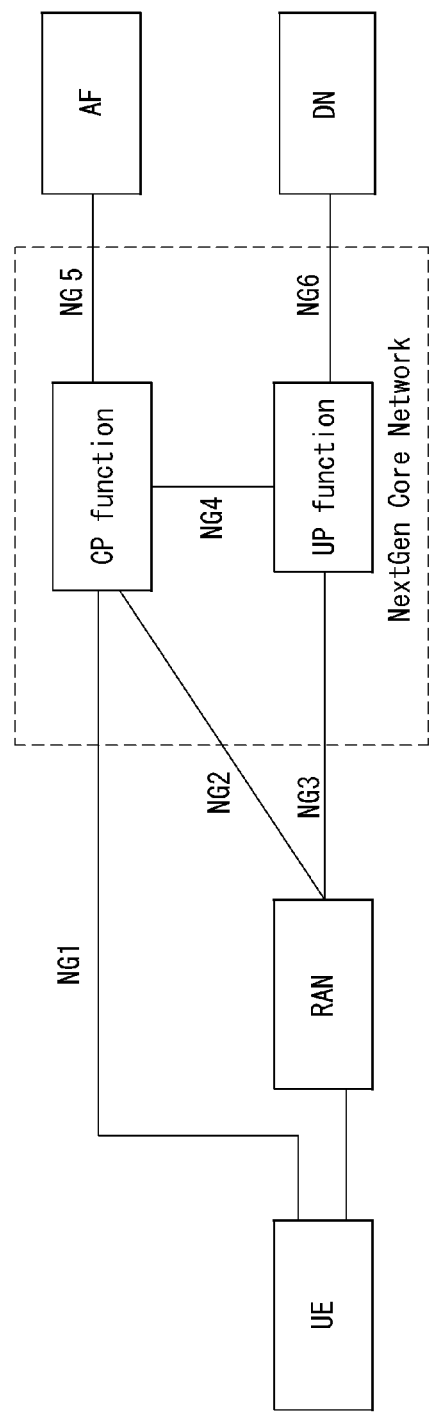

[FIG. 14]
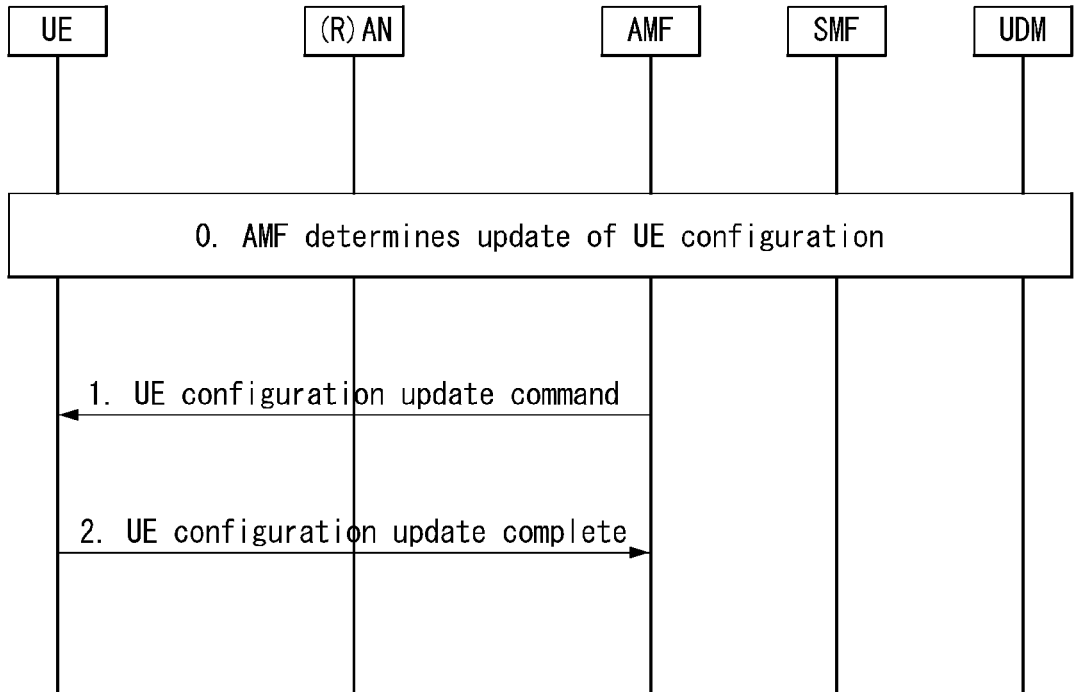
[FIG. 15]
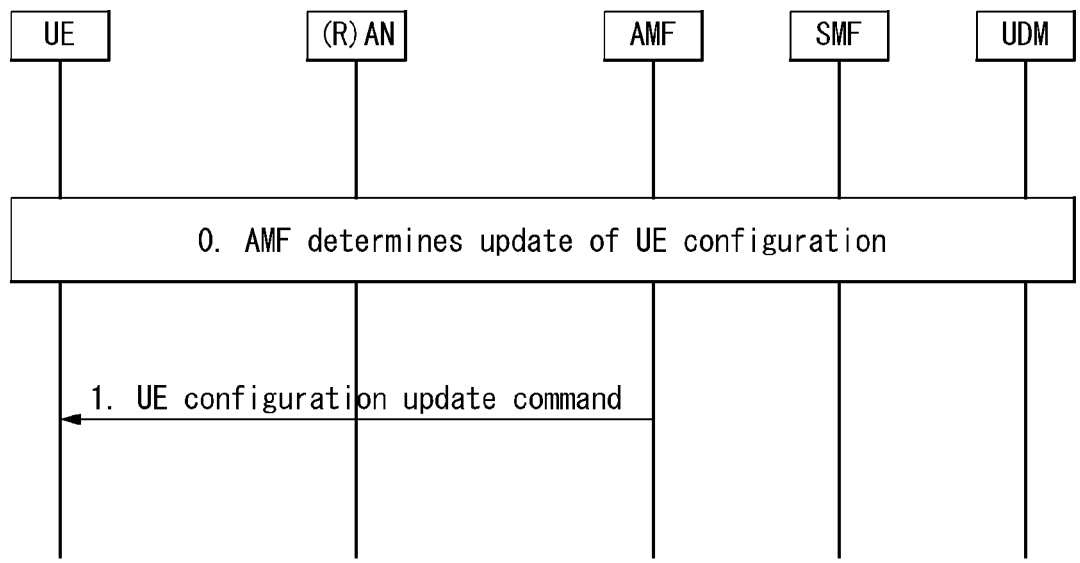

[FIG. 16]
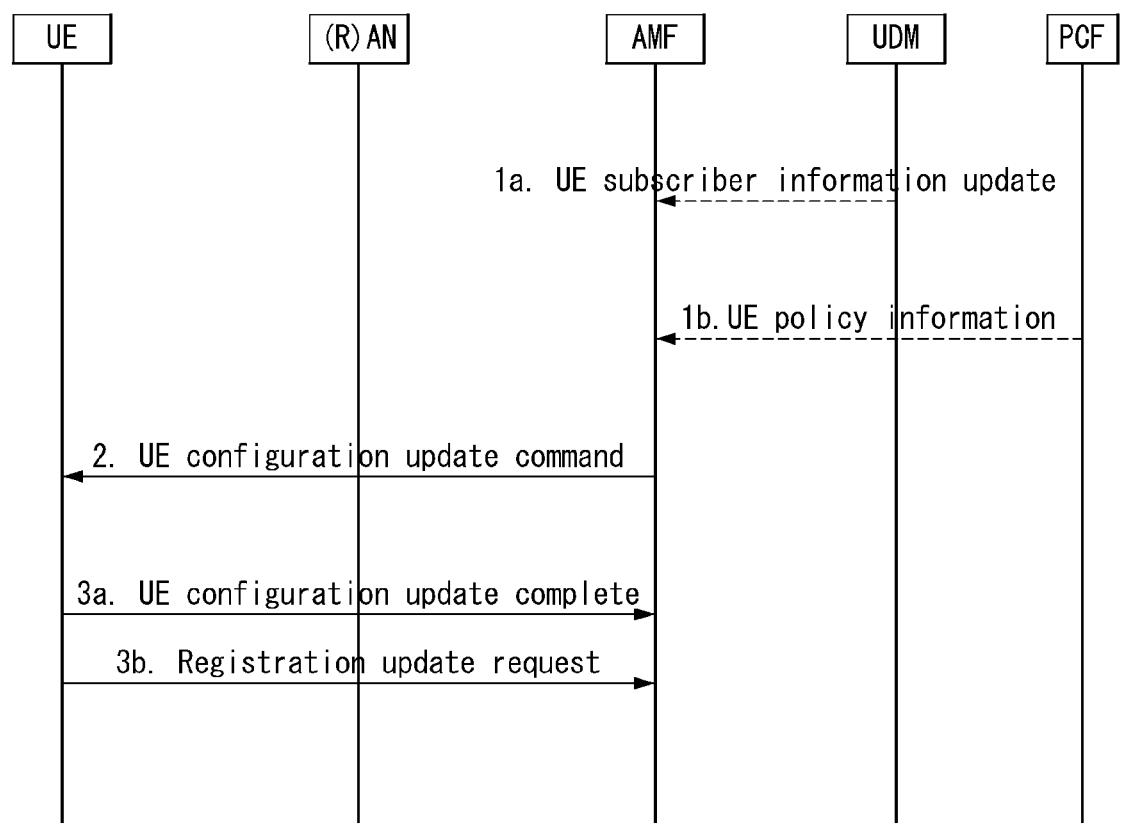

[FIG. 17]
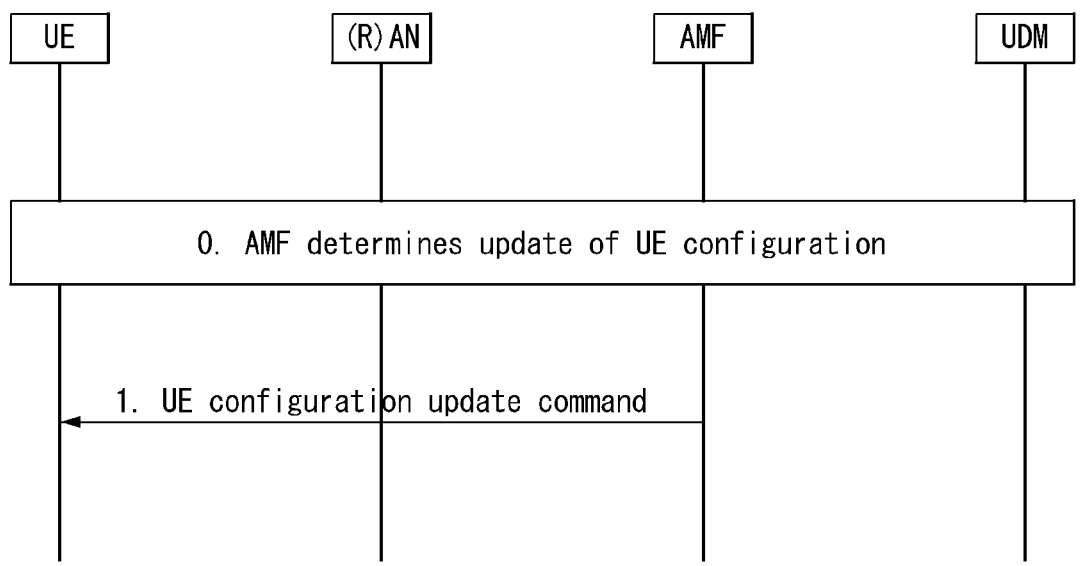

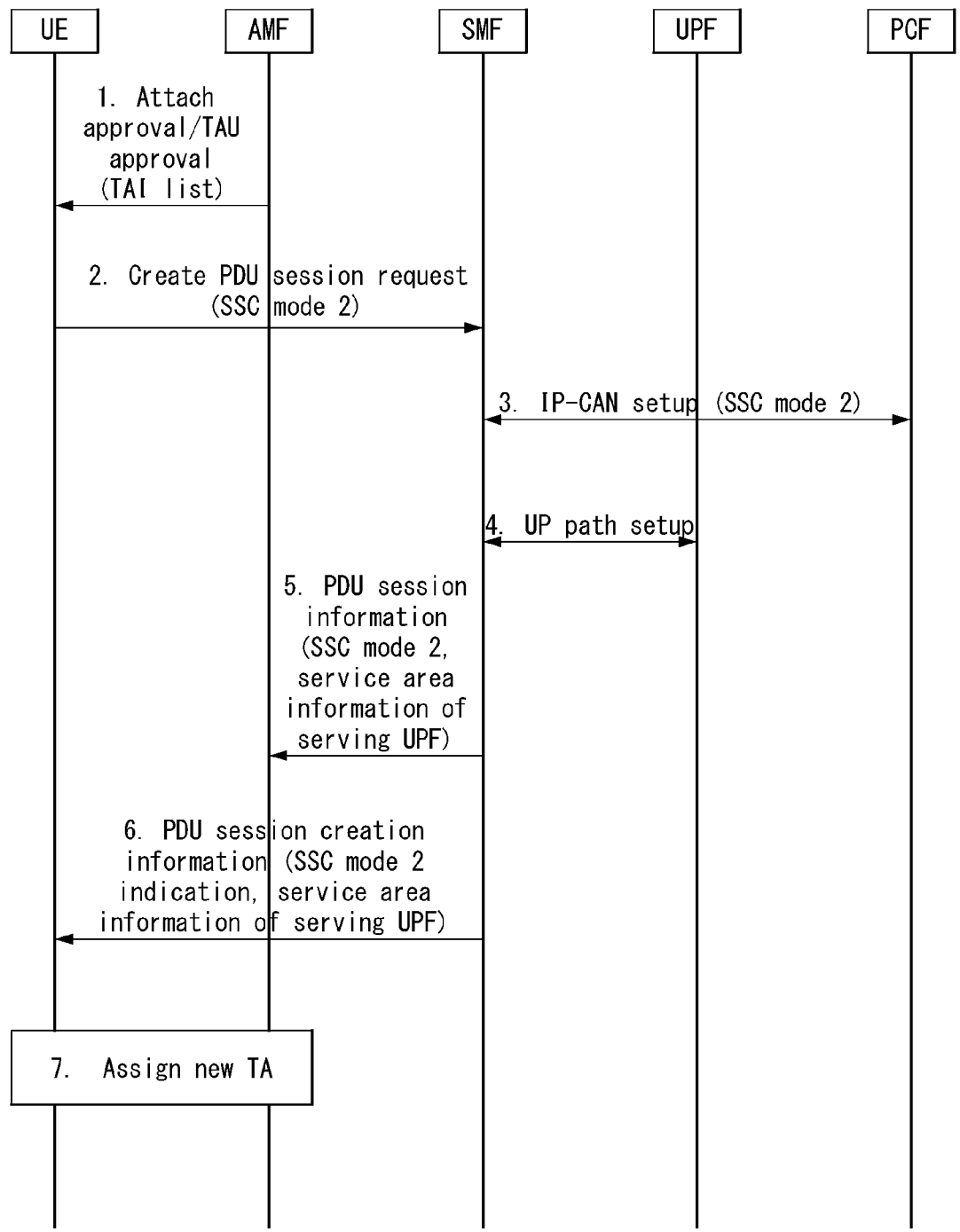

[FIG. 19]
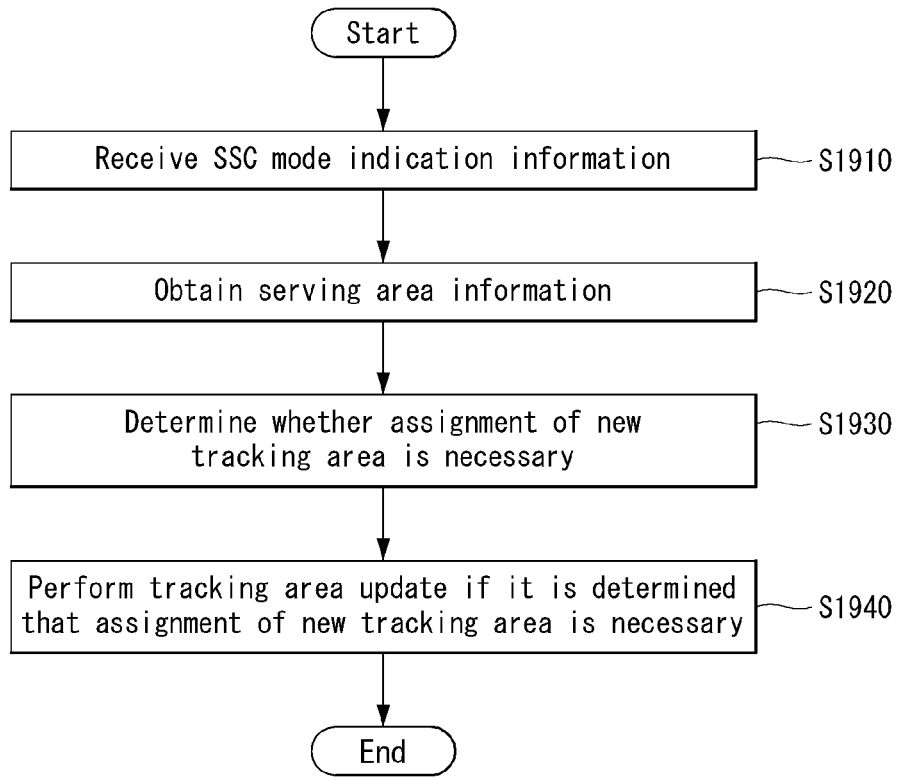
[FIG. 20]
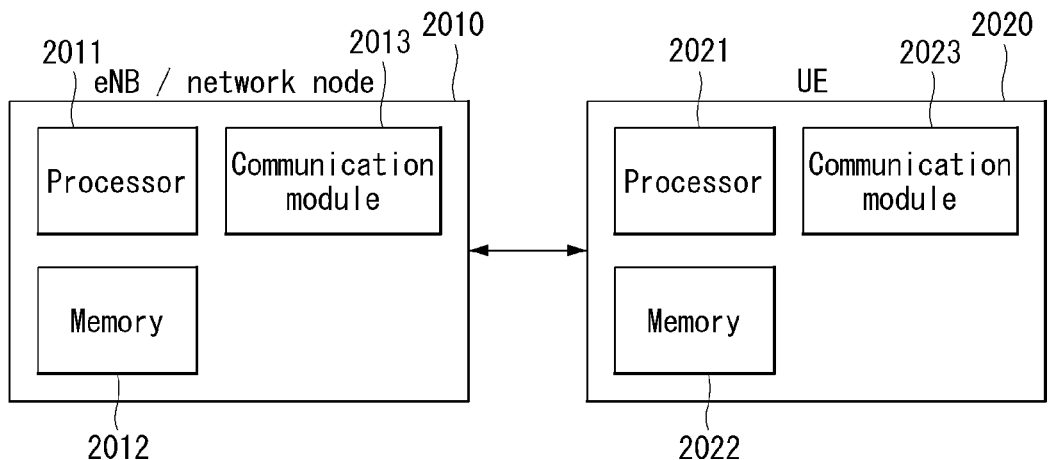

[FIG. 21]
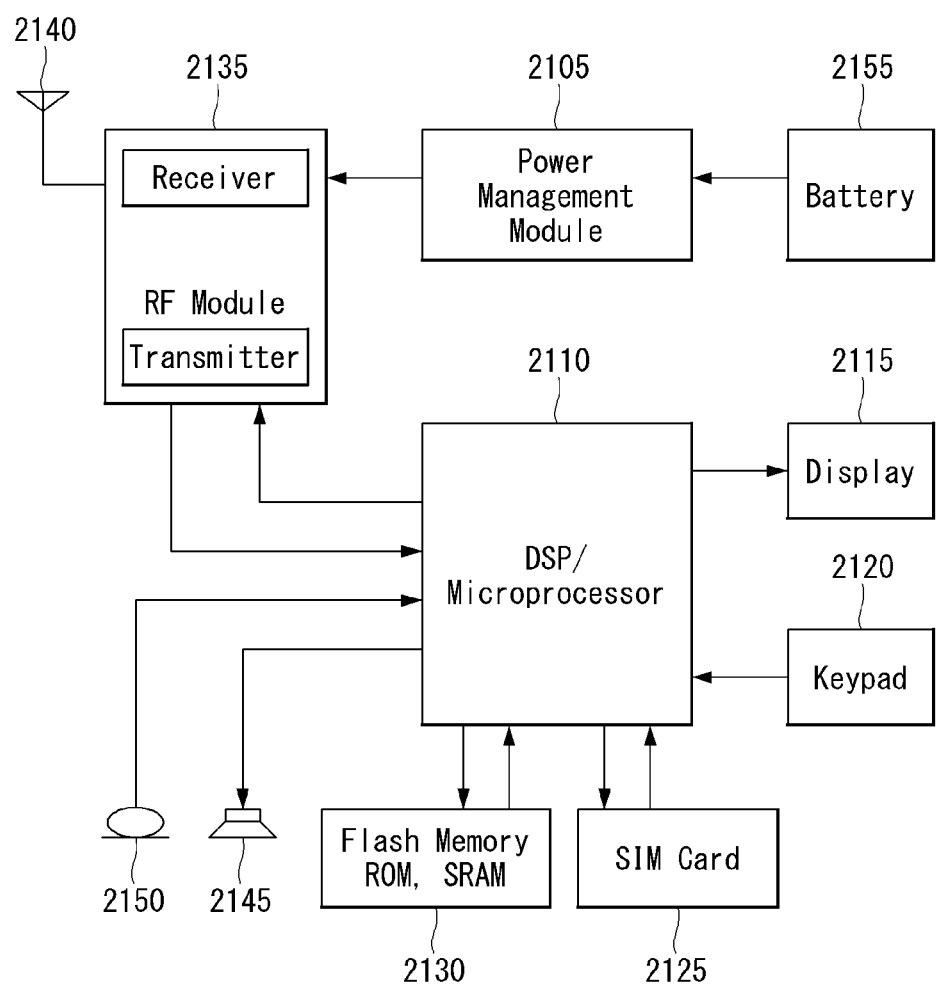

TRACKING AREA ASSIGNMENT METHOD IN WIRELESS COMMUNICATION SYSTEM AND DEVICE THEREFOR

CROSS-REFERENCE TO RELATED APPLICATIONS

This application is the National Stage filing under 35 U.S.C. 371 of International Application No. PCT/KR2017/014544 filed on Dec. 12, 2017, which claims the benefit of U.S. Provisional Application No. 62/434,436 filed on Dec. 15, 2016, No. 62/505,039 filed on May 11, 2017. The contents of this application are hereby incorporated by reference in its entirety.

BACKGROUND OF THE INVENTION

Field of the Invention

The present invention relates to a wireless communication system and, more particularly, to an AMF tracking area assignment method for supporting a specific SSC mode and a device performing the same.

Related Art

A mobile communication system has been developed to provide a voice service while guaranteeing activity of a user. However, the mobile communication system extends an area up to a data service as well as a voice and at present, a short phenomenon of a resource is caused due to an explosive increase of traffic and uses require a higher-speed service, and as a result, a more developed mobile communication system is required.

Requirements of a next-generation mobile communication system largely need to support the accommodation of explosive data traffic, an epochal increase of the transmission rate per user, the accommodation of the significantly increased number of connection devices, very low end-to-end latency, and high energy efficiency. To this end, various technologies have been researched, which include dual connectivity, massive multiple input multiple output (MIMO), in-band full duplex, non-orthogonal multiple access (NOMA), super wideband supporting, device networking, and the like.

SUMMARY OF THE INVENTION

The present invention provides an efficient method for aligning the serving area of a serving UPF and a tracking area assigned to a UE in order to support an SSC mode 2.

The present invention also provides an efficient method for assigning a new tracking area to a UE or updating a tracking area for alignment between the serving area of a serving UPF and a tracking area assigned to the UE.

Technical objects to be achieved in the present invention are not limited to the above-described technical objects, and other technical objects not described above may be evidently understood by a person having ordinary skill in the art to which the present invention pertains from the following description.

In an aspect, a tracking area assignment method by an access and mobility management function (AMF) in a wireless communication system may include receiving, from a session management function (SMF), service and session continuity (SSC) mode indication information for a protocol data unit (PDU) session generated for a user equipment (UE), obtaining serving area information for a serving area of a serving user plane function (UPF) associated with the PDU session, determining the assignment of a new tracking area to the UE is necessary based on a tracking area pre-assigned to the UE and the serving area, and performing tracking area update for the assignment of the new tracking area to the UE if it is determined that the assignment of the new tracking area is necessary.

Furthermore, determining whether the assignment of the new tracking area to the UE is necessary may include determining whether the pre-assigned tracking area and the serving area have been aligned by comparing the pre-assigned tracking area and the serving area, and determining that the assignment of the new tracking area is unnecessary if it is determined that the pre-assigned tracking area and the serving area have been aligned, and determining that the assignment of the new tracking area is necessary if it is determined that the pre-assigned tracking area and the serving area have not been aligned.

Furthermore, determining whether the pre-assigned tracking area and the serving area have been aligned may include determining whether a tracking area included in the serving area, but not assigned to the UE is present, and determining that the pre-assigned tracking area and the serving area have not been aligned if it is determined that the not-assigned tracking area is present and determining that the pre-assigned tracking area and the serving area have been aligned if it is determined that the not-assigned tracking area is not present, Furthermore, the tracking area assignment method may further include receiving, from the SMF, priority information for each generated PDU session if the PDU session generated for the UE is plural.

Furthermore, the priority information may be determined based on a data network name (DNN), single network slice selection assistance information (S-NSSAI) and/or policy of the PDU session.

Furthermore, when the PDU session generated for the UE is plural, determining whether the assignment of the new tracking area to the UE is necessary may include determining whether the assignment of the new tracking area to the UE is necessary based on a serving area of a serving UPF, associated with a PDU session having high priority based on the priority information, and the tracking area pre-assigned to the UE.

Furthermore, when the PDU session generated for the UE is plural, determining whether the assignment of the new tracking area to the UE is necessary may include determining whether the assignment of the new tracking area to the UE is necessary based on a serving area of serving UPFs, associated with all of a plurality of PDU sessions, and the tracking area pre-assigned to the UE.

Furthermore, the serving area information may have been transmitted by the SMF or pre-configured in the AMF for each UPF.

Furthermore, when the serving area information is transmitted by the SMF, the serving area information may be transmitted by the SMF as PDU session information along with the SSC mode indication information.

Furthermore, the tracking area assignment method may further include receiving, from the SMF, an address or ID of the serving UPF if the serving area information has been pre-configured in the AMF for each UPF.

Furthermore, obtaining the serving area information may include obtaining serving area information of a UPF corresponding to the address or ID of the serving UPF, among the serving area information pre-configured in the AMF for each UPF.

Furthermore, performing the tracking area update further may include transmitting, to the UE, indication triggering the tracking area update.

Furthermore, the SSC mode indication information may indicate at least one SSC mode to be applied to the PDU session, among a plurality of pre-defined SSC modes.

Furthermore, in an aspect, an access and mobility management function (AMF) assigning a tracking area to a user equipment (UE) in a wireless communication system includes a communication module configured to transmit and receive signals and a processor functionally connected to the communication module. The processor may be configured to control the communication module to receive, from a session management function (SMF), service and session continuity (SSC) mode indication information for a protocol data unit (PDU) session generated for the UE, obtain serving area information for a serving area of a serving user plane function (UPF) associated with the PDU session, determine the assignment of a new tracking area to the UE is necessary based on a tracking area pre-assigned to the UE and the serving area, and perform tracking area update for the assignment of the new tracking area to the UE if it is determined that the assignment of the new tracking area is necessary. Furthermore, the processor may be configured to determine whether the pre-assigned tracking area and the serving area have been aligned by comparing the pre-assigned tracking area and the serving area, if it is determined that the assignment of the new tracking area to the UE is necessary and to determine that the assignment of the new tracking area is unnecessary if it is determined that the pre-assigned tracking area and the serving area have been aligned, and determine that the assignment of the new tracking area is necessary if it is determined that the pre-assigned tracking area and the serving area have not been aligned.

BRIEF DESCRIPTION OF THE DRAWINGS

The accompanying drawings, which are included to provide a further understanding of the invention as a part of detailed descriptions, illustrate embodiments of the invention and together with the descriptions, serve to explain the technical principles of the invention.

FIG. 1 illustrates an Evolved Packet System (EPS) to which the present invention can be applied.

FIG. 2 illustrates one example of an Evolved Universal Terrestrial Radio Access Network (E-UTRAN) to which the present invention can be applied.

FIG. 3 illustrates structures of an E-UTRAN and an EPC in a wireless communication system to which the present invention may be applied.

FIG. 4 illustrates a radio interface protocol structure between a UE and an E-UTRAN in a wireless communication system to which the present invention may be applied.

FIG. 5 is a diagram illustrating in brief the structure of a physical channel in a wireless communication system to which the present invention may be applied.

FIG. 6 is a diagram illustrating 5G system architecture using a reference point representation.

FIG. 7 is a diagram illustrating 5G system architecture using a service-based representation.

FIG. 8 illustrates NG-RAN architecture to which the present invention may be applied.

FIG. 9 is a diagram illustrating a radio protocol stack to which the present invention may be applied.

FIG. 10 illustrates RM state models to which the present invention may be applied.

FIG. 11 illustrates CM state models to which the present invention may be applied.

FIG. 12 illustrates classification and user plane marking for a QoS flow and the mapping of a QoS flow to AN resources according to an embodiment of the present invention.

FIG. 13 is a diagram illustrating 5G system architecture to which the present invention may be applied.

FIG. 14 illustrates a QoS flow mapping method for uplink traffic of a UE to which the present invention may be applied.

FIG. 15 is a diagram illustrating a UE configuration update procedure not having ACK to which the present invention may be applied.

FIG. 16 is a diagram illustrating a UE configuration update procedure having ACK to which the present invention may be applied.

FIG. 17 is a diagram illustrating a UE configuration update procedure not having ACK to which the present invention may be applied.

FIG. 18 is a diagram illustrating a tracking area assignment method by an AMF according to an embodiment of the present invention.

FIG. 19 is a flowchart illustrating a tracking area assignment method by an AMF according to an embodiment of the present invention.

FIG. 20 illustrates a block diagram of a communication device according to an embodiment of the present invention.

FIG. 21 illustrates a block diagram of a communication device according to an embodiment of the present invention.

DESCRIPTION OF EXEMPLARY
EMBODIMENTS

In what follows, preferred embodiments according to the present invention will be described in detail with reference to appended drawings. The detailed descriptions provided below together with appended drawings are intended only to explain illustrative embodiments of the present invention, which should not be regarded as the sole embodiments of the present invention. The detailed descriptions below include specific information to provide complete understanding of the present invention. However, those skilled in the art will be able to comprehend that the present invention can be embodied without the specific information.

For some cases, to avoid obscuring the technical principles of the present invention, structures and devices well-known to the public can be omitted or can be illustrated in the form of block diagrams utilizing fundamental functions of the structures and the devices.

A base station in this document is regarded as a terminal node of a network, which performs communication directly with a UE. In this document, particular operations regarded to be performed by the base station may be performed by a upper node of the base station depending on situations. In other words, it is apparent that in a network consisting of a plurality of network nodes including a base station, various operations performed for communication with a UE can be performed by the base station or by network nodes other than the base station. The term Base Station (BS) can be replaced with a fixed station, Node B, evolved-NodeB (eNB), Base Transceiver System (BTS), or Access Point (AP). Also, a terminal can be fixed or mobile; and the term can be replaced with User Equipment (UE), Mobile Station (MS), User Terminal (UT), Mobile Subscriber Station (MSS), Subscriber Station (SS), Advanced Mobile Station (AMS), Wireless Terminal (WT), Machine-Type Communication (MTC) device, Machine-to-Machine (M2M) device, or Device-to-Device (D2D) device.

In what follows, downlink (DL) refers to communication from a base station to a terminal, while uplink (UL) refers to communication from a terminal to a base station. In downlink transmission, a transmitter can be part of the base station, and a receiver can be part of the terminal. Similarly, in uplink transmission, a transmitter can be part of the terminal, and a receiver can be part of the base station.

Specific terms used in the following descriptions are introduced to help understanding the present invention, and the specific terms can be used in different ways as long as it does not leave the technical scope of the present invention.

The technology described below can be used for various types of wireless access systems based on Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), or Non-Orthogonal Multiple Access (NOMA). CDMA can be implemented by such radio technology as Universal Terrestrial Radio Access (UTRA) or CDMA2000. TDMA can be implemented by such radio technology as Global System for Mobile communications (GSM), General Packet Radio Service (GPRS), or Enhanced Data rates for GSM Evolution (EDGE). OFDMA can be implemented by such radio technology as the IEEE 802.11 (Wi-Fi), the IEEE 802.16 (WiMAX), the IEEE 802-20, or Evolved UTRA (E-UTRA). UTRA is part of the Universal Mobile Telecommunications System (UMTS). The 3rd Generation Partnership Project (3GPP) Long Term Evolution (LTE) is part of the Evolved UMTS (E-UMTS) which uses the E-UTRA, employing OFDMA for downlink and SC-FDMA for uplink transmission. The LTE-A (Advanced) is an evolved version of the 3GPP LTE system.

Embodiments of the present invention can be supported by standard documents disclosed in at least one of wireless access systems including the IEEE 802, 3GPP, and 3GPP2 specifications. In other words, among the embodiments of the present invention, those steps or parts omitted for the purpose of clearly describing technical principles of the present invention can be supported by the documents above. Also, all of the terms disclosed in this document can be explained with reference to the standard documents.

To clarify the descriptions, this document is based on the 3GPP LTE/LTE-A, but the technical features of the present invention are not limited to the current descriptions.

Terms used in this document are defined as follows.

Universal Mobile Telecommunication System (UMTS): the 3rd generation mobile communication technology based on GSM, developed by the 3GPP Evolved Packet System (EPS): a network system comprising an Evolved Packet Core (EPC), a packet switched core network based on the Internet Protocol (IP) and an access network such as the LTE and UTRAN. The EPS is a network evolved from the UMTS.

NodeB: the base station of the UMTS network. NodeB is installed outside and provides coverage of a macro cell.

eNodeB: the base station of the EPS network. eNodeB is installed outside and provides coverage of a macro cell.

User Equipment (UE): A UE can be called a terminal, Mobile Equipment (ME), or Mobile Station (MS). A UE can be a portable device such as a notebook computer, mobile phone, Personal Digital Assistant (PDA), smart phone, or a multimedia device; or a fixed device such as a Personal Computer (PC) or vehicle-mounted device. The term UE may refer to an MTC terminal in the description related to MTC.

IP Multimedia Subsystem (IMS): a sub-system providing multimedia services based on the IP International Mobile Subscriber Identity (IMSI): a globally unique subscriber identifier assigned in a mobile communication network Machine Type Communication (MTC): communication performed by machines without human intervention. It may be called Machine-to-Machine (M2M) communication.

MTC terminal (MTC UE or MTC device or MRT apparatus): a terminal (e.g., a vending machine, meter, and so on) equipped with a communication function (e.g., communication with an MTC server through PLMN) operating through a mobile communication network and performing the MTC functions.

MTC server: a server on a network managing MTC terminals. It can be installed inside or outside a mobile communication network. It can provide an interface through which an MTC user can access the server. Also, an MTC server can provide MTC-related services to other servers (in the form of Services Capability Server (SCS)) or the MTC server itself can be an MTC Application Server.

(MTC) application: services (to which MTC is applied) (for example, remote metering, traffic movement tracking, weather observation sensors, and so on)

(MTC) Application Server: a server on a network in which (MTC) applications are performed MTC feature: a function of a network to support MTC applications. For example, MTC monitoring is a feature intended to prepare for loss of a device in an MTC application such as remote metering, and low mobility is a feature intended for an MTC application with respect to an MTC terminal such as a vending machine.

MTC user: an MTC user uses a service provided by an MTC server.

MTC subscriber: an entity having a connection relationship with a network operator and providing services to one or more MTC terminals.

MTC group: an MTC group shares at least one or more MTC features and denotes a group of MTC terminals belonging to MTC subscribers.

Services Capability Server (SCS): an entity being connected to the 3GPP network and used for communicating with an MTC InterWorking Function (MTC-IWF) on a Home PLMN (HPLMN) and an MTC terminal. The SCS provides the capability for a use by one or more MTC applications.

External identifier: a globally unique identifier used by an external entity (for example, an SCS or an Application Server) of the 3GPP network to indicate (or identify) an MTC terminal (or a subscriber to which the MTC terminal belongs). An external identifier comprises a domain identifier and a local identifier as described below.

Domain identifier: an identifier used for identifying a domain in the control region of a mobile communication network service provider. A service provider can use a separate domain identifier for each service to provide an access to a different service.

Local identifier: an identifier used for deriving or obtaining an International Mobile Subscriber Identity (IMSI). A local identifier should be unique within an application domain and is managed by a mobile communication network service provider.

Radio Access Network (RAN): a unit including a Node B, a Radio Network Controller (RNC) controlling the Node B, and an eNodeB in the 3GPP network. The RAN is defined at the terminal level and provides a connection to a core network.

Home Location Register (HLR)/Home Subscriber Server (HSS): a database provisioning subscriber information within the 3GPP network. An HSS can perform functions of configuration storage, identity management, user state storage, and so on.

RAN Application Part (RANAP): an interface between the RAN and a node in charge of controlling a core network (in other words, a Mobility Management Entity (MME)/Serving GPRS (General Packet Radio Service) Supporting Node (SGSN)/Mobile Switching Center (MSC)).

Public Land Mobile Network (PLMN): a network formed to provide mobile communication services to individuals. The PLMN can be formed separately for each operator.

Non-Access Stratum (NAS): a functional layer for exchanging signals and traffic messages between a terminal and a core network at the UMTS and EPS protocol stack. The NAS is used primarily for supporting mobility of a terminal and a session management procedure for establishing and maintaining an IP connection between the terminal and a PDN GW.

Service Capability Exposure Function (SCEF): an entity in 3GPP architecture for the service capability exposure that provides a means for safely exposing a service and a capability provided by 3GPP network interface.

In what follows, the present invention will be described based on the terms defined above.

Overview of System to which the Present Invention can be Applied

FIG. 1 illustrates an Evolved Packet System (EPS) to which the present invention can be applied.

The network structure of FIG. 1 is a simplified diagram restructured from an Evolved Packet System (EPS) including Evolved Packet Core (EPC).

The EPC is a main component of the System Architecture Evolution (SAE) intended for improving performance of the 3GPP technologies. SAE is a research project for determining a network structure supporting mobility between multiple heterogeneous networks. For example, SAE is intended to provide an optimized packet-based system which supports various IP-based wireless access technologies, provides much more improved data transmission capability, and so on.

More specifically, the EPC is the core network of an IP-based mobile communication system for the 3GPP LTE system and capable of supporting packet-based real-time and non-real time services. In the existing mobile communication systems (namely, in the 2nd or 3rd mobile communication system), functions of the core network have been implemented through two separate sub-domains: a Circuit-Switched (CS) sub-domain for voice and a Packet-Switched (PS) sub-domain for data. However, in the 3GPP LTE system, an evolution from the 3rd mobile communication system, the CS and PS sub-domains have been unified into a single IP domain. In other words, in the 3GPP LTE system, connection between UEs having IP capabilities can be established through an IP-based base station (for example, eNodeB), EPC, and application domain (for example, IMS). In other words, the EPC provides the architecture essential for implementing end-to-end IP services.

The EPC comprises various components, where FIG. 1 illustrates part of the EPC components, including a Serving Gateway (SGW or S-GW), Packet Data Network Gateway (PDN GW or PGW or P-GW), Mobility Management Entity (MME), Serving GPRS Supporting Node (SGSN), and enhanced Packet Data Gateway (ePDG).

The SGW operates as a boundary point between the Radio Access Network (RAN) and the core network and maintains a data path between the eNodeB and the PDN GW. Also, in case the UE moves across serving areas by the eNodeB, the SGW acts as an anchor point for local mobility. In other words, packets can be routed through the SGW to ensure mobility within the E-UTRAN (Evolved-UMTS (Universal Mobile Telecommunications System) Terrestrial Radio Access Network defined for the subsequent versions of the 3GPP release 8). Also, the SGW may act as an anchor point for mobility between the E-UTRAN and other 3GPP networks (the RAN defined before the 3GPP release 8, for example, UTRAN or GERAN (GSM (Global System for Mobile Communication)/EDGE (Enhanced Data rates for Global Evolution) Radio Access Network).

The PDN GW corresponds to a termination point of a data interface to a packet data network. The PDN GW can support policy enforcement features, packet filtering, charging support, and so on. Also, the PDN GW can act as an anchor point for mobility management between the 3GPP network and non-3GPP networks (for example, an unreliable network such as the Interworking Wireless Local Area Network (I-WLAN) or reliable networks such as the Code Division Multiple Access (CDMA) network and Wimax).

In the example of a network structure as shown in FIG. 1, the SGW and the PDN GW are treated as separate gateways; however, the two gateways can be implemented according to single gateway configuration option.

The MME performs signaling for the UE's access to the network, supporting allocation, tracking, paging, roaming, handover of network resources, and so on; and control functions. The MME controls control plane functions related to subscribers and session management. The MME manages a plurality of eNodeBs and performs signaling of the conventional gateway's selection for handover to other 2G/3G networks. Also, the MME performs such functions as security procedures, terminal-to-network session handling, idle terminal location management, and so on.

The SGSN deals with all kinds of packet data including the packet data for mobility management and authentication of the user with respect to other 3GPP networks (for example, the GPRS network).

The ePDG acts as a security node with respect to an unreliable, non-3GPP network (for example, I-WLAN, WiFi hotspot, and so on).

As described with respect to FIG. 1, a UE with the IP capability can access the IP service network (for example, the IMS) that a service provider (namely, an operator) provides, via various components within the EPC based not only on the 3GPP access but also on the non-3GPP access.

Also, FIG. 1 illustrates various reference points (for example, S1-U, S1-MME, and so on). The 3GPP system defines a reference point as a conceptual link which connects two functions defined in disparate functional entities of the E-UTAN and the EPC. Table 1 below summarizes reference points shown in FIG. 1. In addition to the examples of FIG. 1, various other reference points can be defined according to network structures.

TABLE 1

| Reference point | Description |
| --- | --- |
| S1-MME | Reference point for the control plane protocol between E-UTRAN and MME |
| S1-U | Reference point between E-UTRAN and Serving GW for the per bearer user plane tunneling and inter eNodeB path switching during handover |
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS core and the 3GPP anchor function of Serving GW. In addition, if direct tunnel is not established, it provides the user plane tunneling. |
| S5 | It provides user plane tunneling and tunnel management between Serving GW and PDN GW. It is used for Serving GW relocation due to UE mobility if the Serving GW needs to connect to a non-collocated PDN GW for the required PDN connectivity. |
| S11 | Reference point for the control plane protocol between MME and SGW |
| SGi | It is the reference point between the PDN GW and the packet data network. Packet data network may be an operator external public or private packet data network or an intra-operator packet data network (e.g., for provision of IMS services). This reference point corresponds to Gi for 3GPP accesses. |

Among the reference points shown in FIG. 1, S2a and S2b corresponds to non-3GPP interfaces. S2a is a reference point which provides reliable, non-3GPP access, related control between PDN GWs, and mobility resources to the user plane. S2b is a reference point which provides related control and mobility resources to the user plane between ePDG and PDN GW.

FIG. 2 illustrates one example of an Evolved Universal Terrestrial Radio Access Network (E-UTRAN) to which the present invention can be applied.

The E-UTRAN system has evolved from an existing UTRAN system and may be the 3GPP LTE/LTE-A system, for example. A communication system is disposed over a wide area to provide various communication services including voice communication through IMS and packet data (for example, VoIP (Voice over Internet Protocol)).

Referring to FIG. 2, an E-UMTS network comprises an E-UTRAN, EPC, and one or more UEs. The E-UTRAN comprises eNBs providing a UE with a control plane and user plane protocols, where the eNBs are connected to each other through X2 interface.

The X2 user plane interface (X2-U) is defined among the eNBs. The X2-U interface provides non-guaranteed delivery of the user plane Protocol Data Unit (PDU). The X2 control plane interface (X2-CP) is defined between two neighboring eNBs. The X2-CP performs the functions of context delivery between eNBs, control of user plane tunnel between a source eNB and a target eNB, delivery of handover-related messages, uplink load management, and so on.

The eNB is connected to the UE through a radio interface and is connected to the Evolved Packet Core (EPC) through the S1 interface.

The S1 user plane interface (S1-U) is defined between the eNB and the Serving Gateway (S-GW). The S1 control plane interface (S1-MME) is defined between the eNB and the Mobility Management Entity (MME). The S interface performs the functions of EPS bearer service management, NAS signaling transport, network sharing, MME load balancing management, and so on. The S1 interface supports many-to-many-relation between the eNB and the MME/S-GW.

The MME is capable of performing various functions such as NAS signaling security, AS (Access Stratum) security control, inter-CN (Core Network) signaling for supporting mobility among 3GPP access networks, IDLE mode UE reachability (including performing and controlling retransmission of a paging message), TAI (Tracking Area Identity) management (for IDLE and active mode UEs), PDN GW and SGW selection, MME selection for handover in which MMEs are changed, SGSN selection for handover to a 2G or 3G 3GPP access network, roaming, authentication, bearer management function including dedicated bearer establishment, and support for transmission of a PWS (Public Warning System) (including Earthquake and Tsunami Warning System (ETWS) and Commercial Mobile Alert System (CMAS)) message.

FIG. 3 illustrates structures of an E-UTRAN and an EPC in a wireless communication system to which the present invention may be applied.

Referring to FIG. 3, an eNB is capable of performing functions such as selection of a gateway (for example, MME), routing to a gateway during Radio Resource Control (RRC) activation, scheduling and transmission of a Broadcast Channel (BCH), dynamic resource allocation for a UE in uplink and downlink transmission, and mobility control connection in an LTE_ACTIVE state. As described above, a gateway belonging to an EPC is capable of performing functions such as paging origination, LTE_IDLE state management, ciphering of a user plane, System Architecture Evolution (SAE) bearer control, and ciphering of NAS signaling and integrity protection.

FIG. 4 illustrates a radio interface protocol structure between a UE and an E-UTRAN in a wireless communication system to which the present invention can be applied.

FIG. 4(a) illustrates a radio protocol structure for the control plane, and FIG. 4(b) illustrates a radio protocol structure for the user plane.

Referring to FIG. 4, layers of the radio interface protocol between the UE and the E-UTRAN can be divided into a first layer (L1), a second layer (L2), and a third layer (L3) based on the lower three layers of the Open System Interconnection (OSI) model, widely known in the technical field of communication systems. The radio interface protocol between the UE and the E-UTRAN consists of the physical layer, data link layer, and network layer in the horizontal direction, while in the vertical direction, the radio interface protocol consists of the user plane, which is a protocol stack for delivery of data information, and the control plane, which is a protocol stack for delivery of control signals.

The control plane acts as a path through which control messages used for the UE and the network to manage calls are transmitted. The user plane refers to the path through which the data generated in the application layer, for example, voice data, Internet packet data, and so on are transmitted. In what follows, described will be each layer of the control and the user plane of the radio protocol.

The physical layer (PHY), which is the first layer (L1), provides information transfer service to upper layers by using a physical channel. The physical layer is connected to the Medium Access Control (MAC) layer located at the upper level through a transport channel through which data are transmitted between the MAC layer and the physical layer. Transport channels are classified according to how and with which features data are transmitted through the radio interface. And data are transmitted through the physical channel between different physical layers and between the physical layer of a transmitter and the physical layer of a receiver. The physical layer is modulated according to the Orthogonal Frequency Division Multiplexing (OFDM) scheme and employs time and frequency as radio resources.

A few physical control channels are used in the physical layer. The Physical Downlink Control Channel (PDCCH) informs the UE of resource allocation of the Paging Channel (PCH) and the Downlink Shared Channel (DL-SCH); and Hybrid Automatic Repeat reQuest (HARQ) information related to the Uplink Shared Channel (UL-SCH). Also, the PDCCH can carry a UL grant used for informing the UE of resource allocation of uplink transmission. The Physical Control Format Indicator Channel (PCFICH) informs the UE of the number of OFDM symbols used by PDCCHs and is transmitted at each subframe. The Physical HARQ Indicator Channel (PHICH) carries a HARQ ACK (ACKnowledge)/NACK (Non-ACKnowledge) signal in response to uplink transmission. The Physical Uplink Control Channel (PUCCH) carries uplink control information such as HARQ ACK/NACK with respect to downlink transmission, scheduling request, Channel Quality Indicator (CQI), and so on. The Physical Uplink Shared Channel (PUSCH) carries the UL-SCH.

The MAC layer of the second layer (L2) provides a service to the Radio Link Control (RLC) layer, which is an upper layer thereof, through a logical channel. Also, the MAC layer provides a function of mapping between a logical channel and a transport channel; and multiplexing/demultiplexing a MAC Service Data Unit (SDU) belonging to the logical channel to the transport block, which is provided to a physical channel on the transport channel.

The RLC layer of the second layer (L2) supports reliable data transmission. The function of the RLC layer includes concatenation, segmentation, reassembly of the RLC SDU, and so on. To satisfy varying Quality of Service (QoS) requested by a Radio Bearer (RB), the RLC layer provides three operation modes: Transparent Mode (TM), Unacknowledged Mode (UM), and Acknowledge Mode (AM). The AM RLC provides error correction through Automatic Repeat reQuest (ARQ). Meanwhile, in case the MAC layer performs the RLC function, the RLC layer can be incorporated into the MAC layer as a functional block.

The Packet Data Convergence Protocol (PDCP) layer of the second layer (L2) performs the function of delivering, header compression, ciphering of user data in the user plane, and so on. Header compression refers to the function of reducing the size of the Internet Protocol (IP) packet header which is relatively large and includes unnecessary control to efficiently transmit IP packets such as the IPv4 (Internet Protocol version 4) or IPv6 (Internet Protocol version 6) packets through a radio interface with narrow bandwidth. The function of the PDCP layer in the control plane includes delivering control plane data and ciphering/integrity protection.

The Radio Resource Control (RRC) layer in the lowest part of the third layer (L3) is defined only in the control plane. The RRC layer performs the role of controlling radio resources between the UE and the network. To this purpose, the UE and the network exchange RRC messages through the RRC layer. The RRC layer controls a logical channel, transport channel, and physical channel with respect to configuration, re-configuration, and release of radio bearers. A radio bearer refers to a logical path that the second layer (L2) provides for data transmission between the UE and the network. Configuring a radio bearer indicates that characteristics of a radio protocol layer and channel are defined to provide specific services; and each individual parameter and operating methods thereof are determined. Radio bearers can be divided into Signaling Radio Bearers (SRBs) and Data RBs (DRBs). An SRB is used as a path for transmitting an RRC message in the control plane, while a DRB is used as a path for transmitting user data in the user plane.

The Non-Access Stratum (NAS) layer in the upper of the RRC layer performs the function of session management, mobility management, and so on.

A cell constituting the base station is set to one of 1.25, 2.5, 5, 10, and 20 MHz bandwidth, providing downlink or uplink transmission services to a plurality of UEs. Different cells can be set to different bandwidths.

Downlink transport channels transmitting data from a network to a UE include a Broadcast Channel (BCH) transmitting system information, PCH transmitting paging messages, DL-SCH transmitting user traffic or control messages, and so on. Traffic or a control message of a downlink multi-cast or broadcast service can be transmitted through the DL-SCH or through a separate downlink Multicast Channel (MCH). Meanwhile, uplink transport channels transmitting data from a UE to a network include a Random Access Channel (RACH) transmitting the initial control message and a Uplink Shared Channel (UL-SCH) transmitting user traffic or control messages.

A logical channel lies above a transmission channel and is mapped to the transmission channel. The logical channel may be divided into a control channel for delivering control area information and a traffic channel for delivering user area information. The control channel may include a BCCH (Broadcast Control Channel), PCCH (Paging Control Channel), CCCH (Common Control Channel), DCCH (Dedicated Control Channel), and MCCH (Multicast Control Channel). The traffic channel may include a DTCH (Dedicated Traffic Channel) and MTCH (Multicast Traffic Channel). The PCCH is a downlink channel for delivering paging information and is used when a network does not know the cell to which a UE belongs. The CCCH is used by a UE that does not have an RRC connection to a network. The MCCH is a point-to-multipoint downlink channel used for delivering MBMS (Multimedia Broadcast and Multicast Service) control information from a network to a UE. The DCCH is a point-to-point bi-directional channel used by a UE with an RRC connection delivering dedicated control information between a UE and a network. The DTCH is a point-to-point channel dedicated to one UE for delivering user information that may exist in an uplink and downlink. The MTCH is a point-to-multipoint downlink channel for delivering traffic data from a network to a UE.

In the case of an uplink connection between a logical channel and a transport channel, the DCCH may be mapped to a UL-SCH, and the DTCH may be mapped to a UL-SCH, and the CCCH may be mapped to a UL-SCH. In the case of a downlink connection between a logical channel and a transport channel, the BCCH may be mapped to a BCH or DL-SCH, the PCCH may be mapped to a PCH, the DCCH may be mapped to a DL-SCH, the DTCH may be mapped to a DL-SCH, the MCCH may be mapped to an MCH, and the MTCH may be mapped to the MCH.

FIG. 5 is a diagram illustrating in brief the structure of a physical channel in a wireless communication system to which the present invention may be applied.

Referring to FIG. 5, a physical channel transfers signaling and data through radio resources including one or more subcarriers in a frequency domain and one or more symbols in a time domain.

One subframe having a length of 1.0 ms includes a plurality of symbols. A specific symbol(s) of the subframe (e.g., the first symbol of the subframe) may be used for a PDCCH. The PDCCH carries information (e.g., a resource block and modulation and coding scheme (MCS) and so on) about dynamically allocated resources.

New Generation Radio Access Network (NG-RAN) (or RAN) System

Terms used in a new generation radio access network may be defined as follows.

Evolved packet system (EPS): a network system including an evolved packet core (EPC), that is, an Internet protocol (IP)-based packet switched core network, and an access to network such as LTE or UTRAN. A network is an evolved network form of universal mobile telecommunications system (UMTS).

eNodeB: an eNB of an EPS network. It is disposed outdoors and has coverage of a macro cell volume.

International Mobile Subscriber Identity (IMSI): a user identity internationally uniquely allocated in a mobile communication network.

Public Land Mobile Network (PLMN): a network configured to provide persons with a mobile communication service. It may be differently configured for each operator.

5G system (5GS): a system including a 5G access network (AN), a 5G core network and a user equipment (UE).

5G access network (5G-AN) (or AN): an access network including a new generation radio access network (NG-RAN) and/or a non-3GPP access network (non-3GPP AN) connected to a 5G core network.

New generation radio access network (NG-RAN) (or RAN): a radio access network having a common characteristic in that it is connected to 5GC and supporting one or more of the following options:
1) Standalone new radio.
2) New radio, that is, an anchor supporting an E-UTRA extension.
3) Standalone E-UTRA (e.g., eNodeB).
4) Anchor supporting a new radio extension 5G core network (5GC): a core network connected to a 5G access network Network function (NF): it means a processing function adopted in 3GPP within a network or defined in 3GPP. The processing function includes a defined functional behavior and an interface defined in 3GPP.

NF service: it is a (consumed) function exposed by an NF through a service-based interface and used by another authenticated NF(s).

Network slice: a logical network providing a specific network capability(s) and network characteristic(s).

Network slice instance: a set of NF instance(s) forming a network slice and required resource(s) (e.g., calculation, storage and networking resources)

Protocol data unit (PDU) connectivity service: a service providing the exchange of PDU(s) between a UE and a data network.

PDU session: an association providing PDU connectivity service between a UE and a data network. An association type may be an Internet protocol (IP) or Ethernet or may be unstructured.

Non-access stratum (NAS): a functional layer for exchanging signaling or traffic messages between a UE and a core network in an EPS, 5GS protocol stack. It has a main function of supporting the mobility of a UE and supporting a session management procedure.

5G system architecture to which the present invention may be applied

A 5G system is a technology advanced from the 4th generation LTE mobile communication technology and a new radio access technology (RAT) through the evolution of the existing mobile communication network structure or a clean-state structure and an extended technology of long term evolution (LTE), and it supports extended LTE (eLTE), non-3GPP (e.g., WLAN) access and so on.

A 5G system is defined based on a service, and an interaction between network functions (NFs) within architecture for a 5G system may be expressed by two methods as follows.

Reference point representation (FIG. 6): indicates an interaction between NF services within NFs described by a point-to-point reference point (e.g., N11) between two NFs (e.g., AMF and SMF).

Service-based representation (FIG. 7): network functions (e.g., AMFs) within a control plane (CP) permit other authenticated network functions to access its own service. If this representation is necessary, it also includes a point-to-point reference point.

FIG. 6 is a diagram illustrating 5G system architecture using a reference point representation.

Referring to FIG. 6, the 5G system architecture may include various elements (i.e., a network function (NF)). This drawing illustrates an authentication server function (AUSF), a (core) access and mobility management function (AMF), a session management function (SMF), a policy control function (PCF), an application function (AF), united data management (UDM), a data network (DN), a user plane function (UPF), a (radio) access network ((R)AN) and a user equipment (UE) corresponding to some of the various elements.

Each of the NFs supports the following functions.

AUSF stores data for the authentication of a UE.

AMF provides a function for access of a UE unit and mobility management and may be basically connected to one AMF per one UE.

Specifically, the AMF supports functions, such as signaling between CN nodes for mobility between 3GPP access networks, the termination of a radio access network (RAN) CP interface (i.e., N2 interface), the termination (N1) of NAS signaling, NAS signaling security (NAS ciphering and integrity protection), AS security control, registration area management, connection management, idle mode UE reachability (including control and execution of paging retransmission), mobility management control (subscription and policy), intra-system mobility and inter-system mobility support, the support of network slicing, SMF selection, lawful interception (for an AMF event and an interface to an LI system), the provision of transfer of a session management (SM) message between a UE and an SMF, a transparent proxy for SM message routing, access authentication, access authorization including a roaming right check, the provision of transfer of an SMS message between a UE and an SMSF, a security anchor function (SEA) and/or security context management (SCM).

Some or all of the functions of the AMF may be supported within a single instance of one AMF.

DN means an operator service, Internet access or a 3rd party service, for example. The DN transmits a downlink protocol data unit (PDU) to an UPF or receives a PDU, transmitted by a UE, from a UPF.

PCF provides a function for receiving information about a packet flow from an application server and determining a policy, such as mobility management and session management. Specifically, the PCF supports functions, such as the support of a unified policy framework for controlling a network behavior, the provision of a policy rule so that a CP function(s) (e.g., AMF or SMF) can execute a policy rule, and the implementation of a front end for accessing related subscription information in order to determine a policy within user data repository (UDR).

SMF provides a session management function and may be managed by a different SMF for each session if a UE has a plurality of sessions.

Specifically, the SMF supports functions, such as session management (e.g., session setup, modification and release including the maintenance of a tunnel between a UPF and an AN node), UE IP address allocation and management (optionally including authentication), the selection and control of the UP function, a traffic steering configuration for routing traffic from the UPF to a proper destination, the termination of an interface toward policy control functions, the execution of the control part of a policy and QoS, lawful interception (for an SM event and an interface to an LI system), the termination of the SM part of an NAS message, downlink data notification, the initiator of AN-specific SM information (transferred to an AN through N2 via the AMF), the determination of an SSC mode of a session, and a roaming function.

Some or all of the functions of the SMF may be supported within a single instance of one SMF.

UDM stores the subscription data of a user, policy data, etc. UDM includes two parts, that is, an application front end (FE) and user data repository (UDR).

The FE includes a UDM FE responsible for the processing of location management, subscription management and credential and a PCF responsible for policy control. The UDR stores data required for functions provided by the UDM-FE and a policy profile required by the PCF. Data stored within the UDR includes user subscription data, including a subscription ID, security credential, access and mobility-related subscription data and session-related subscription data, and policy data. The UDM-FE supports functions, such as access to subscription information stored in the UDR, authentication credential processing, user identification handling, access authentication, registration/mobility management, subscription management, and SMS management.

UPF transfers a downlink PDU, received from a DN, to a UE via an (R)AN and transfers an uplink PDU, received from a UE, to a DN via an (R)AN.

Specifically, the UPF supports functions, such as an anchor point for intra/inter RAT mobility, the external PDU session point of interconnection to a data network, packet routing and forwarding, a user plane part for the execution of packet inspection and a policy rule, lawful interception, a traffic usage report, an uplink classifier for supporting the routing of traffic flow of a data network, a branching point for supporting a multi-home PDU session, QoS handling (e.g., the execution of packet filtering, gating and an uplink/downlink rate) for a user plane, uplink traffic verification (SDF mapping between a service data flow (SDF) and a QoS flow), transport level packet marking within the uplink and downlink, downlink packet buffering, and a downlink data notification triggering function. Some or all of the functions of the UPF may be supported within a single instance of one UPF.

The AF interoperates with a 3GPP core network in order to provide services (e.g., support functions, such as an application influence on traffic routing, network capability exposure access, an interaction with a policy framework for policy control).

The (R)AN collectively refers to a new radio access network supporting all of evolved E-UTRA (E-UTRA) and new radio (NR) access technologies (e.g., gNB), that is, an advanced version of the 4G radio access technology.

The gNB supports functions for radio resource management (i.e., radio bearer control and radio admission control), connection mobility control, the dynamic allocation (i.e., scheduling) of resources to a UE in the uplink/downlink, Internet protocol (IP) header compression, the encryption and integrity protection of a user data stream, the selection of an AMF upon attachment of a UE if routing to the AMF has not been determined based on information provided to the UE, the selection of an AMF upon attachment of a UE, user plane data routing to an UPF(s), control plane information routing to an AMF, connection setup and release, the scheduling and transmission of a paging message (generated from an AMF), the scheduling and transmission of system broadcast information (generated from an AMF or operation and maintenance (O&M)), a measurement and measurement report configuration for mobility and scheduling, transport level packet marking in the uplink, session management, the support of network slicing, QoS flow management and mapping to a data radio bearer, the support of a UE that is an inactive mode, the distribution function of an NAS message, an NAS node selection function, radio access network sharing, dual connectivity, and tight interworking between an NR and an E-UTRA.

A UE means a user device. A user apparatus may be called a term, such as a terminal, a mobile equipment (ME) or a mobile station (MS). Furthermore, the user apparatus may be a portable device, such as a notebook, a mobile phone, a personal digital assistant (PDA), a smartphone or a multimedia device, or may be a device that cannot be carried, such as a personal computer (PC) or a vehicle-mounted device.

In the drawings, for the clarity of description, an unstructured data storage network function (UDSF), a structured data storage network function (SDSF), a network exposure function (NEF) and an NF repository function (NRF) are not shown, but all of the NFs shown in this drawing may perform mutual operations along with the UDSF, NEF and NRF, if necessary.

NEF provides means for safely exposing services and capabilities provided by 3GPP network functions, for example, for a 3rd party, internal exposure/re-exposure, an application function, and edge computing. The NEF receives information from other network function(s) (based on the exposed capability(s) of other network function(s)). The NEF may store information received as structured data using a standardized interface as a data storage network function. The stored information is re-exposed to other network function(s) and application function(s) by the NEF and may be used for other purposes, such as analysis.

NRF supports a service discovery function. It receives an NF discovery request from an NF instance and provides information of a discovered NF instance to an NF instance. Furthermore, it maintains available NF instances and services supported by the available NF instances.

SDSF is an optional function for supporting a function of storing and retrieving information as structured data by any NEF.

UDSF is an optional function for supporting a function of storing and retrieving information as unstructured data by any NF.

Meanwhile, this drawing illustrates a reference model if a UE accesses one DN using one PDU session, for convenience of description, but the present invention is not limited thereto.

A UE may access two (i.e., local and central) data networks at the same time using multiple PDU sessions. In this case, for different PDU sessions, two SMFs may be selected. In this case, each SMF may have the ability to control both a local UPF and central UPF within a PDU session.

Furthermore, a UE may access two (i.e., local and central) data networks provided within one PDU session at the same time.

In the 3GPP system, a conceptual link that connects NFs within the 5G system is defined as a reference point. The following illustrates reference points included in 5G system architecture represented in this drawing.

N1: a reference point between a UE and an AMF
N2: a reference point between an (R)AN and an AMF
N3: a reference point between an (R)AN and a UPF
N4: a reference point between an SMF and a UPF
N5: a reference point between a PCF and an AF
N6: a reference point between a UPF and a data network
N7: a reference point between an SMF and a PCF
N24: a reference point between a PCF within a visited network and a PCF within a home network
N8: a reference point between a UDM and an AMF
N9: a reference point between two core UPFs
N10: a reference point between a UDM and an SMF
N11: a reference point between an AMF and an SMF
N12: a reference point between an AMF and an AUSF
N13: a reference point between a UDM and an authentication server function (AUSF)
N14: a reference point between two AMFs
N15: a reference point between a PCF and an AMF in the case of a non-roaming scenario and a reference point between a PCF within a visited network and an AMF in the case of a roaming scenario
N16: a reference point between two SMFs (in the case of a roaming scenario, a reference point between an SMF within a visited network and an SMF within a home network)
N17: a reference point between an AMF and an EIR
N18: a reference point between any NF and an UDSF
N19: a reference point between an NEF and an SDSF FIG. 7 is a diagram illustrating 5G system architecture using a service-based representation.

A service-based interface illustrated in this drawing shows a set of services provided/exposed by a specific NF. The service-based interface is used within a control plane. The following illustrates service-based interfaces included in the 5G system architecture represented as in this drawing.

Namf: a service-based interface exhibited by an AMF
Nsmf: a service-based interface exhibited by an SMF
Nnef: a service-based interface exhibited by an NEF
Npcf: a service-based interface exhibited by a PCF
Nudm: a service-based interface exhibited by a UDM
Naf: a service-based interface exhibited by an AF
Nnrf: a service-based interface exhibited by an NRF
Nausf: a service-based interface exhibited by an AUSF NF service is a kind of capability exposed to another NF (i.e., NF service consumer) by an NF (i.e., NF service supplier) through a service-based interface. The NF may expose one or more NF service(s). In order to define NF service, the following criteria are applied:

NF services are derived from an information flow for describing an end-to-end function.

A complete end-to-end message flow is described by the sequence of NF service invocation.

Two operations for NF(s) to provide their services through service-based interfaces are as follows:

i) "Request-response": a control plane NF_B (i.e., NF service supplier) receives a request to provide a specific NF service (including the execution of an operation and/or the provision of information) from another control plane NF_A (i.e., NF service consumer). NF_B sends NF service results based on information provided by NF_A within a request as a response.

In order to satisfy a request, NF_B may alternately consume NF services from other NF(s). In the request-response mechanism, communication is performed in a one-to-one manner between two NFs (i.e., consumer and supplier).

ii) "subscribe-notify"

A control plane NF_A (i.e., NF service consumer) subscribes to an NF service provided by another control plane NF_B (i.e., NF service supplier). A plurality of control plane NF(s) may subscribe to the same control plane NF service. NF_B notifies interested NF(s) that have subscribed to NF services of the results of the NF services. A subscription request from a consumer may include a notification request for notification triggered through periodical update or a specific event (e.g., the change, specific threshold arrival, etc. of requested information). The mechanism also includes a case where NF(s) (e.g., NF_B) implicitly subscribe to specific notification without an explicit subscription request (e.g., due to a successful registration procedure).

FIG. 8 illustrates NG-RAN architecture to which the present invention may be applied.

Referring to FIG. 8, a new generation radio access network (NG-RAN) includes an NR NodeB (gNB)(s) and/or an eNodeB (eNB)(s) for providing the termination of a user plane and control plane protocol toward a UE.

An Xn interface is connected between gNBs and between a gNB(s) and an eNB(s) connected to 5GC. The gNB(s) and the eNB(s) are also connected to 5GC using an NG interface. More specifically, the gNB(s) and eNB(s) are also connected to an AMF using an NG-C interface (i.e., N2 reference point), that is, a control plane interface between an NG-RAN and 5GC and are connected to a UPF using an NG-U interface (i.e., N3 reference point), that is, a user plane interface between an NG-RAN and 5GC.

Radio Protocol Architecture

FIG. 9 is a diagram illustrating a radio protocol stack to which the present invention may be applied. Specifically, FIG. 9(a) illustrates a radio interface user plane protocol stack between a UE and a gNB, and FIG. 9(b) illustrates a radio interface control plane protocol stack between the UE and the gNB.

A control plane means a passage through which control messages are transmitted in order for a UE and a network to manage a call. A user plane means a passage through which data generated in an application layer, for example, voice data or Internet packet data is transmitted.

Referring to FIG. 9(a), the user plane protocol stack may be divided into a first layer (Layer 1) (i.e., a physical layer (PHY) layer) and a second layer (Layer 2).

Referring to FIG. 9(b), the control plane protocol stack may be divided into a first layer (i.e., a PHY layer), a second layer, a third layer (i.e., a radio resource control (RRC) layer) and a non-access stratum (NAS) layer.

The second layer is divided into a medium access control (MAC) sublayer, a radio link control (RLC) sublayer, a packet data convergence protocol (PDC) sublayer, and a service data adaptation protocol (SDAP) sublayer (in the case of a user plane).

Radio bearers are classified into two groups: a data radio bearer (DRB) for user plane data and a signaling radio bearer (SRB) for control plane data Hereinafter, the layers of the control plane and user plane of the radio protocol are described.

1) The PHY layer, that is, the first layer, provides information transfer service to a higher layer using a physical channel. The PHY layer is connected to the MAC sublayer located in a high level through a transport channel. Data is transmitted between the MAC sublayer and the PHY layer through a transport channel. The transport channel is classified depending on how data is transmitted according to which characteristics through a radio interface. Furthermore, data is transmitted between different physical layers, that is, between the PHY layer of a transmission stage and the PHY layer of a reception stage through a physical channel.

2) The MAC sublayer performs mapping between a logical channel and a transport channel; the multiplexing/demultiplexing of an MAC service data unit (SDU) belonging to one logical channel or different logical channels to/from a transport block (TB) transferred to/from the PHY layer through a transport channel; a scheduling information report; error correction through a hybrid automatic repeat request (HARQ); priority handling between UEs using dynamic scheduling; priority handling between the logical channels of one UE using logical channel priority; and padding.

Different types of data transfer service provided by the MAC sublayer. Each logical channel type defines that information of which type is transferred.

Logical channels are classified into two groups: a control channel and a traffic channel.

i) The control channel is used to transfer only control plane information and is as follows.

Broadcast control channel (BCCH): a downlink channel system for broadcasting control information.

Paging control channel (PCCH): a downlink channel transferring paging information and system information change notification.

Common control channel (CCCH): a channel for transmitting control information between a UE and a network. This channel is used for UEs not having an RRC connection with a network.

Dedicated control channel (DCCH): a point-to-point bidirectional channel for transmitting dedicated control information between a UE and a network. It is used by a UE having an RRC connection.

ii) The traffic channel is used to use only user plane information:

Dedicated traffic channel (DTCH): a point-to-point channel for transferring user information and dedicated to a single UE. The DTCH may be present in both the uplink and downlink.

In the downlink, a connection between a logical channel and a transport channel is as follows.

A BCCH may be mapped to a BCH. A BCCH may be mapped to a DL-SCH. A PCCH may be mapped to a PCH. A CCCH may be mapped to a DL-SCH. A DCCH may be mapped to a DL-SCH. A DTCH may be mapped to a DL-SCH.

In the uplink, a connection between a logical channel and a transport channel is as follows. A CCCH may be mapped to an UL-SCH. A DCCH may be mapped to an UL-SCH. A DTCH may be mapped to an UL-SCH.

3) The RLC sublayer supports three transport modes: a transparent mode (TM), an unacknowledged mode (UM) and acknowledged mode (AM).

An RLC configuration may be applied to each logical channel. In the case of an SRB, the TM or AM mode is used. In contrast, in the case of a DRB, the UM or AM mode is used.

The RLC sublayer performs the transfer a higher layer PDU; independent sequence numbering with a PDCP; error correction through an automatic repeat request (ARW); segmentation and re-segmentation; the reassembly of an SDU; RLC SDU discard; and RLC re-establishment.

4) The PDCP sublayer for a user plane performs sequence numbering; header compression and compression-decompression (corresponding to only robust header compression (RoHC)); user data transfer; reordering and duplicate detection (if there is transfer to a layer higher than the PDCP); PDCP PDU routing (in the case of a split bearer); the retransmission of a PDCP SDU; ciphering and deciphering; PDCP SDU discard; PDCP re-establishment and data recovery for RLC AM; and the duplication of a PDCP PDU.

The PDCP sublayer a control plane additionally performs sequence numbering; ciphering, deciphering and integrity protection; control plane data transfer; duplication detection; the duplication of a PDCP PDU.

When duplication for a radio bearer is configured by RRC, an additional RLC entity and an additional logical channel are added to a radio bearer in order to control a duplicated PDCP PDU(s). In the PDCP, duplication includes transmitting the same PDCP PDU(s) twice. The first one is transferred to the original RLC entity, and the second one is transferred to an additional RLC entity. In this case, the duplication corresponding to the original PDCP PDU is not transmitted to the same transport block. Different two logical channels may belong to the same MAC entity (in the case of a CA) or to different MAC entities (in the case of DC). In the former case, a logical channel mapping restriction is used to guarantee that a duplication corresponding to the original PDCP PDU is not transferred to the same transport block.

5) The SDAP sublayer performs i) mapping between a QoS flow and a data radio bearer and ii) QoS flow ID marking within a downlink and uplink packet.

One protocol entity of an SDAP is configured for each PDU session, but exceptionally in the case of dual connectivity (DC), two SDAP entities may be configured.

6) The RRC sublayer performs the broadcasting of system information related to an access stratum (AS) and a non-access stratum (NAS); paging initiated by 5GC or an NG-RAN; the establishment, maintenance and release (additionally including the modification and release of a carrier aggregation and additionally including the modification and release of dual connectivity between an E-UTRAN and an NR or within an NR) of an RRC connection between a UE and an NG-RAN; a security function including key management; the establishment, configuration, maintenance and release of an SRB(s) and a DRB(s); handover and context transfer; control of UE cell selection, re-release and cell selection/reselection; a mobility function including mobility between RATs; a QoS management function, a UE measurement report and report control; the detection of a radio link failure and recovery from a radio link failure; and the transfer of an NAS message from an NAS to a UE and the transfer of an NAS message from a UE to an NAS.

Network Slicing

A 5G system has introduced a network slicing technology which provides network resources and network functions to an independent slice based on each service.

As network slicing is introduced, the isolation, independent management, etc. of a network function and network resources can be provided for each slice. Accordingly, services that are independent for each service or user and that are more flexible can be provided by selecting and combining network functions of the 5G system depending on a service or user.

A network slice refers to a network that logically integrates an access network and a core network.

The network slice may include one or more of the followings:

Core network control plane and user plane function

NG-RAN

Non-3GPP interworking function (N3IWF) toward a non-3GPP access network

A function supported for each network slice and network function optimization may be different. A plurality of network slice instances may provide the same function to different groups of UEs.

One UE may be connected to one or more network slice instances at the same time via a 5G-AN. One UE may be served at the same time by a maximum of 8 network slices. An AMF instance that serves a UE may belong to each network slice instance that serves the UE. That is, the AMF instance may be common to a network slice instance that serves the UE. The CN part of a network slice instance(s) that serves a UE is selected by a CN.

One PDU session belongs to only a specific one network slice instance for each PLMN. Different network slice instances do not share one PDU session.

One PDU session belongs to a specific one network slice instance for each PLMN. Different slices may have slice-specific PDU sessions using the same DNN, but different network slice instances do not share one PDU session.

Single network slice selection assistance information (S-NSSAI) identifies a network slice. Each S-NSSAI is assistant information used for a network to select a specific network slice instance. The NSSAI is a set of S-NSSAI(s). The S-NSSAI includes the followings:

Slice/service type (SST): the SST indicates the operation of a network slice expected form a viewpoint of a function and service.

Slice differentiator (SD): the SD is optional information that supplements an SST(s) for selecting a network slice instance from a plurality of potential network slice instances all of which comply with an indicated SST.

1) Upon Initial Access, Network Slice Selection

A Configured NSSAI may be configured in a UE by a home PLMN (HPLMN) for each PLMN. The Configured NSSAI becomes PLMN-specific, and the HPLMN indicates a PLMN(s) to which each Configured NSSAI has been applied.

Upon initial connection of a UE, an RAN selects an initial network slice that will transfer a message using an NSSAI. To this end, in a registration procedure, a UE provides a requested NSSAI to a network. In this case, when the UE provides the requested NSSAI to the network, a UE within a specific PLMN uses only S-NSSAIs belonging to the Configured NSSAI of the corresponding PLMN.

If a UE does not provide an NSSAI to an RAN and an RAN does not select a proper network slice based on the provided NSSAI, the RAN may select a default network slice.

Subscription data includes the S-NSSAI(s) of a network slice(s) to which a UE has subscribed. One or more S-NSSAI(s) may be marked as a default S-NSSAI. When an S-NSSAI is marked by default, although a UE does not transmit any S-NSSAI to a network within a Registration Request, the network may serve the UE through a related network slice.

When a UE is successfully registered, a CN notifies an (R)AN of all of Allowed NSSAIs (including one or more S-NSSAIs) by providing the NSSAIs. Furthermore, when the registration procedure of the UE is successfully completed, the UE may obtain an Allowed NSSAI for a PLMN from an AMF.

The Allowed NSSAI has precedence over the Configured NSSAI for the PLMN. Thereafter, the UE uses only an S-NSSAI(s) within the Allowed NSSAI corresponding to a network slice for a network slice selection-related procedure within the serving PLMN.

In each PLMN, a UE stores a Configured NSSAI and an Allowed NSSAI (if present). When the UE receives an Allowed NSSAI for a PLMN, it overrides the previously stored Allowed NSSAI for the PLMN.

2) Slice Change

A network may change an already selected network slice instance depending on a local policy and the mobility, subscription information change, etc. of a UE. That is, a set of network slices of a UE may be changed at any time while the UE is registered with a network. Furthermore, a change of a set of network slices of a UE may be initiated by a network or under specific conditions.

A network may change a set of allowed network slice(s) with which a UE has been registered based on a local policy, a subscription information change and/or the mobility of the UE. A network may perform such a change during a registration procedure or may notify a UE of a change of a supported network slice(s) using a procedure capable of triggering a registration procedure.

Upon changing the network slice, the network may provide the UE with a new Allowed NSSAI and a tracking area list. The UE includes the new NSSAI in signaling according to a mobility management procedure and transmits the signaling, thereby causing the reselection of a slice instance. An AMF supporting the slice instance may also be changed in response to a change of the slice instance.

When a UE enters an area in which a network slice is no longer available, a core network releases a PDU session for an S-NSSAI corresponding to a network slice that is no longer available through a PDU session release procedure.

When the PDU session corresponding to the slice that is no longer available is released, the UE determines whether the existing traffic can be routed through a PDU session belonging to another slice using a UE policy.

For a change of a set of used S-NSSAI(s), a UE initiates a registration procedure.

3) SMF Selection

A PCF provides a UE with a network slice selection policy (NSSP). The NSSP associates the UE with an S-NSSAI and is used by the UE in order to determine a PDU session to which traffic will be routed.

A network slice selection policy is provided for each application of a UE. This includes a rule by which an S-NSSAI can be mapped for each UE application. The AMF selects an SMF for PDU session management using subscriber information and a local operator policy along with an SM-NSSAI transferred by a UE and DNN information.

When a PDU session for a specific slice instance is established, a CN provides an (R)AN with an S-NSSAI corresponding to the slice instance to which the PDU session belongs so that an RAN can access a specific function of a slice instance.

Session Management

5GC supports a PDU connectivity service, that is, a service that provides the exchange of PDU(s) between a UE and a DN identified by a data network name (DNN) (or an access point name (APN)). The PDU connectivity service is also supported through a PDU session established upon request from the UE.

Each PDU session supports a single PDU session type. That is, when the PDU session is established, it supports the exchange of PDUs of a single type requested by a UE. The following PDU session types are defined. IP version 4 (IPv4), IP version 6 (IPv6), Ethernet, and unstructured. In this case, the type of PDUs exchanged between a UE and a DN are completely transparent in a 5G system.

A PDU session is established using NAS SM signaling exchanged between a UE and an SMF through N1 (upon UE request), modified (upon UE and 5GC request), and released (upon UE and 5GC request). Upon request from an application server, 5GC may trigger a specific application within a UE. When the UE receives a trigger message, it transfers the corresponding message to an identified application. The identified application may establish a PDU session with a specific DNN.

An SMF checks whether a UE request complies with user subscription information. To this end, the SMF obtains SMF level subscription data from UDM. Such data may indicate an accepted PDU session type for each DNN:

A UE registered through a plurality of accesses selects access for setting up a PDU session.

A UE may request to move a PDU session between 3GPP and non-3GPP access. A determination for moving the PDU session between 3GPP and non-3GPP access is made for each PDU session. That is, the UE may have a PDU session using 3GPP access while another PDU session uses non-3GPP access.

Within a PDU session setup request transmitted by a network, a UE provides a PDU session identity (ID). Furthermore, the UE may provide a PDU session type, slicing information, a DNN, service and a session continuity (SSC) mode.

A UE may establish a plurality of PDU sessions with the same DN or different DNs at the same time via 3GPP access and/or via non-3GPP access.

A UE may establish a plurality of PDU sessions with the same DN served by a different UPF end N6.

A UE having a plurality of established PDU sessions may be served by different SMFs.

The user plane path of a different PDU sessions belonging to the same UE (the same or different DNNs) may be fully separated between an UPF and AN interfacing with a DN.

5G system architecture can satisfy various continuity requirements of different application/services within a UE by supporting a session and service continuity (SCC). A 5G system supports different SSC modes. An SSC mode associated with a PDU session anchor is not changed while a PDU session is established.

In the case of a PDU session to which SSC Mode 1 is applied, a network maintains continuity service provided to a UE. In the case of a PDU session of an IP type, an IP address is maintained.

If SSC Mode 2 is used, a network may release continuity service delivered to a UE. Furthermore, the network may release a corresponding PDU session. In the case of a PDU session of an IP type, a network may release an IP address(s) allocated to a UE.

If SSC Mode 3 is used, a change of a user plane can be aware by a UE, but a network guarantees that the UE does not lose connectivity. In order to permit better service continuity, a connection through a new PDU session anchor point is established before a previous connection is terminated. In the case of a PDU session of an IP type, an IP address is not maintained while an anchor is deployed again.

An SSC mode selection policy is used to determine the type of SSC mode associated with an application (or application group) of a UE. An operator may previously configure an SSC mode selection policy in a UE. The policy includes one or more SSC mode selection policy rules which may be used for a UE to determine the type of SSC mode associated with an application (or a group of applications). Furthermore, the policy may include a default SSC mode selection policy rule which may be applied to all of applications of a UE.

If a UE provides an SSC mode when it requests a new PDU session, an SMF selects whether it will accept the requested SSC mode or whether it will modify the requested SSC mode based on subscription information and/or a local configuration. If a UE does not provide an SSC mode when it requests a new PDU session, an SMF selects a default SSC mode for data networks listed within subscription information or applies a local configuration for selecting an SSC mode.

An SMF notifies a UE of an SSC mode selected for a PDU session.

Mobility Management

Registration management (RM) is used to register or deregister a UE/user with/from a network and to establish user context within a network.

1) Registration Management

A UE/user needs to register a network in order to receive service that requests registration. Once the UE/user is registered, the UE may update its own registration with the network in order to periodically maintain reachability (periodical registration update) if applicable, upon moving (mobility registration update), or in order to update its own capability or negotiate a protocol parameter again.

An initial registration procedure includes the execution of a network access control function (i.e., user authentication and access authentication based on a subscription profile within UDM). As the results of the registration procedure, the ID of a serving AMF within the UDM is registered.

FIG. 10 illustrates RM state models to which the present invention may be applied. Specifically, FIG. 10(a) shows an RM state model within a UE, and FIG. 10(b) shows an RM state model within an AMF.

Referring to FIG. 10, in order to reflect the registration state of a UE within a selected PLMN, two RM states of RM-DEREGISTERED and RM-REGISTERED are used within the UE and the AMF.

In the RM-DEREGISTERED state, the UE is not registered with a network. The valid location or routing information of UE context within the AMF is not maintained. Accordingly, the UE is not reachable by the AMF. However, for example, in order to prevent an authentication procedure from being executed for each registration procedure, some UE context may be still stored in the UE and the AMF.

In the RM-DEREGISTERED state, if the UE needs to receive service that requests registration, the UE attempts registration with a selected PLMN using the initial registration procedure. Alternatively, upon initial registration, when the UE receives a Registration Reject, the UE remains in the RM DEREGISTERED state. In contrast, when the UE receives the Registration Accept, it enters the RM-REGISTERED state.

In the RM-DEREGISTERED state, if applicable, the AMF accepts the initial registration of the UE by transmitting a Registration Accept to the UE, and enters the RM-REGISTERED state. Alternatively, if applicable, the AMF rejects the initial registration of the UE by transmitting a Registration Reject to the UE.

In the RM-REGISTERED state, the UE is registered with the network. In the RM-REGISTERED state, the UE may receive service that requests registration with the network.

In the RM-REGISTERED state, if the tracking area identity (TAI) of a current serving cell is not present within a list of TAIs that has been received by the UE from a network, the registration of the UE is maintained. The UE performs a mobility registration update procedure so that the AMF can page the UE. Alternatively, in order to notify a network that the UE is still in the active state, the UE performs a periodic registration update procedure when a periodical update timer expires. Alternatively, in order to update its own capability information or negotiate a protocol parameter with a network again, the UE performs a registration update procedure. Alternatively, if the UE does no longer require registration with a PLMN, the UE performs a deregistration procedure and enters the RM-DEREGISTERED state. The UE may determine deregistration from the network at any time. Alternatively, when the UE receives a Registration Reject message, a Deregistration message or performs a local deregistration procedure without the initiation of any signaling, it enters the RM-DEREGISTERED state.

In the RM-REGISTERED state, when the UE does no longer need to be registered with the PLMN, the AMF performs a deregistration procedure and enters the RM-DEREGISTERED state. The AMF may determine the deregistration of the UE at any time. Alternatively, after an implicit deregistration timer expires, the AMF performs implicit deregistration at any time. The AMF enters the RM-DEREGISTERED state after the implicit deregistration. Alternatively, the AMF performs local deregistration for the UE that has negotiated deregistration at the end of communication. The AMF enters the RM-DEREGISTERED state after local deregistration. Alternatively, if applicable, the AMF accepts or rejects registration update from the UE. The AMF may reject UE registration when it rejects the registration update from the UE.

Registration area management includes a function for allocating or re-allocating a registration area to the UE. The registration area is managed for each access type (i.e., 3GPP access or non-3GPP access).

When the UE is registered with a network through 3GPP access, the AMF allocates a set of tracking area (TA)(s) within a TAI list to the UE. When the AMF allocates a registration area (i.e., a set of TAs within the TAI list), the AMF may consider various types of information (e.g., a mobility pattern and an accepted/non-accepted area). The AMP having the whole PLMN or all of PLMNs as a serving area may allocate the whole PLMN, that is, a registration area, to the UE in the MICO mode.

A 5G system supports the allocation of a TAI list including different 5G-RAT(s) within a single TAI list.

When the UE is registered with a network through non-3GPP access, a registration area for the non-3GPP access corresponds to a unique reserved TAI value (i.e., dedicated to the non-3GPP access). Accordingly, there is a unique TA for the non-3GPP access to 5GC, which is called an N3GPP TAI.

When the TAI list is generated, the AMF includes only a TAI(s) applicable to access through which the TAI list has been transmitted.

2) Connection Management

Connection management (CM) is used to establish and release a signaling connection between the UE and the AMF. CM includes a function of establishing and releasing a signaling connection between the UE and the AMF through N1. The signaling connection is used to enable an NAS signaling exchange between the UE and a core network. The signaling connection includes both an AN signaling connection for the UE between the UE and the AN and an N2 connection for the UE between the AN and the AMF.

FIG. 11 illustrates CM state models to which the present invention may be applied. Specifically, FIG. 11 (a) illustrates a CM state shift within a UE, and FIG. 11 (b) shows a CM state shift within an AMF.

Referring to FIG. 11, in order to reflect the NAS signaling connection of the UE with the AMF, two CM states of CM-IDLE and CM-CONNECTED are used.

The UE in the CM-IDLE state is the RM-REGISTERED state and does not have an NAS signaling connection established with the AMF through N1. The UE performs cell selection, cell reselection and PLMN selection.

An AN signaling connection, an N2 connection and an N3 connection for the UE in the CM-IDLE state are not present.

In the CM-IDLE state, if the UE is not in the MICO mode, it responds to paging by performing a Service Request procedure (if it has received it). Alternatively, when the UE has uplink signaling or user data to be transmitted, it performs a Service Request procedure. Alternatively, whenever an AN signaling connection is established between the UE and the AN, the UE enters the CM-CONNECTED state. Alternatively, the transmission of an initial NAS message (Registration Request, Service Request or Deregistration Request) starts to shift from the CM-IDLE state to the CM-CONNECTED state.

In the CM-IDLE state, if the UE is not in the MICO mode, when the AMF has signaling or the mobile-terminated data to be transmitted to the UE, it performs a network-triggered service request procedure by transmitting a paging request to the corresponding UE. Whenever an N2 connection for a corresponding UE between the AN and the AMF is established, the AMF enters the CM-CONNECTED state.

The UE in the CM-CONNECTED state has an NAS signaling connection with the AMF through N1.

In the CM-CONNECTED state, whenever the AN signaling connection is released, the UE enters the CM-IDLE state.

In the CM-CONNECTED state, whenever an N2 signaling connection and N3 connection for the UE are released, the AMF enters the CM-IDLE state.

When an NAS signaling procedure is completed, the AMF may determine to release the NAS signaling connection of the UE. When the AN signaling connection release is completed, the CM state within the UE changes to the CM-IDLE. When an N2 context release procedure is completed, the CM state for the UE within the AMF changes to the CM-IDLE.

The AMF may maintain the UE in the CM-CONNECTED state until the UE is deregistered from a core network.

The UE in the CM-CONNECTED state may be an RRC Inactive state. When the UE is in the RRC Inactive state, UE reachability is managed by an RAN using assistant information from a core network. Furthermore, when the UE is in the RRC Inactive state, UE paging is managed by the RAN. Furthermore, when the UE is in the RRC Inactive state, the UE monitors paging using the CN and RAN ID of the UE.

The RRC Inactive state is applied to an NG-RAN (i.e., applied to an NR and E-UTRA connected to 5G CN).

The AMF provides assistant information to the NG-RAN in order to assist the determination of the NG-RAN regarding whether the UE will be changed to the RRC Inactive state based on a network configuration.

The RRC Inactive assistant information includes a UE-specific discontinuous reception (DRX) value for RAN paging during the RRC Inactive state and a registration area provided to the UE.

CN assistant information is provided to a serving NG RAN node during N2 activation (i.e., registration, a service request or path switch).

The state of an N2 and the N3 reference point is not changed by the UE that enters the CM-CONNECTED state accompanied by RRC Inactive. The UE in the RRC Inactive state is aware of an RAN notification area.

When the UE is the CM-CONNECTED state accompanied by RRC Inactive, the UE may resume an RRC connection due to uplink data pending, a mobile-initiated signaling procedure (i.e., periodical registration update), a response to RAN paging, or when the UE notifies a network that it has deviated from the RAN notification area.

When the connection of the UE in a different NG-RAN node within the same PLMN resumes, UE AS context is recovered from an old NG RAN node, and the procedure is triggered toward a CN.

When the UE is in the CM-CONNECTED state accompanied by RRC Inactive, the UE performs cell selection on a GERAN/UTRAN/EPS and complies with an idle mode procedure.

Furthermore, the UE in the CM-CONNECTED state accompanied by RRC Inactive enters the CM-IDLE mode and complies with an NAS procedure related to the following cases.

If an RRC resumption procedure fails,

If a movement to the CM-IDLE mode of the UE is required within a failure scenario that cannot be solved in the RRC Inactive mode.

The NAS signaling connection management includes a function for establishing and releasing an NAS signaling connection.

The NAS signaling connection establishment function is provided by the UE and the AMF in order to establish the NAS signaling connection of the UE in the CM-IDLE state.

When the UE in the CM-IDLE state needs to transmit an NAS message, the UE initiates a service request or registration procedure in order to establish a signaling connection to the AMF.

The AMF may maintain the NAS signaling connection until the UE is deregistered from a network based on the preference of the UE, UE subscription information, a UE mobility pattern and a network configuration.

The procedure of releasing the NAS signaling connection is initiated by a 5G (R)AN node or the AMF.

When the UE detects the release of an AN signaling connection, the UE determines that the NAS signaling connection has been released. When the AMF detects that N2 context has been released, the AMF determines that the NAS signaling connection has been released.

3) UE Mobility Restriction

A mobility restriction restricts the service access or mobility control of a UE within a 5G system. A mobility restriction function is provided by a UE, an RAN and a core network.

The mobility restriction is applied to only 3GPP access, but is not applied to non-3GPP access.

In the CM-IDLE state and the CM-CONNECTED state accompanied by RRC Inactive, a mobility restriction is performed by a UE based on information received from a core network. In the CM-CONNECTED state, a mobility restriction is performed by an RAN and a core network.

In the CM-CONNECTED state, a core network provides a handover restriction list for a mobility restriction to an RAN.

The mobility restriction includes an RAT restriction, a forbidden area and a service area restriction as follows:

RAT restriction: the RAT restriction is defined as a 3GPP RAT(s) whose access of a UE is not permitted. A UE within a restricted RAT is not allowed to initiate any communication with a network based on subscription information.

Forbidden area: a UE is not allowed to initiate any communication with a network based on subscription information within a forbidden area under a specific RAT.

Service area restriction: it defines an area in which a UE can initiate cannot initiate communication with a network as follows:

Allowed area: if a UE is allowed by subscription information within an allowed area under a specific RAT, the UE is allowed to initiate communication with a network.

Non-allowed area: a service area for a UE is restricted based on subscription information within a non-allowed area under a specific RAT. The UE and the network are not allowed to initiate session management signaling for obtaining a service request or user service (both the CM-IDLE state and the CM-CONNECTED state). The RM procedure of the UE is the same as that in the allowed area. A UE within a non-allowed area responds to the paging of a core network as a service request.

In a specific UE, a core network determines a service area restriction based on UE subscription information. Optionally, an allowed area may be fine-tuned by a PCF (e.g., based on a UE location, a permanent equipment identifier (PEI) or a network policy). The service area restriction may be changed due to subscription information, a location, a PEI and/or a policy change, for example. The service area restriction may be updated during a registration procedure.

If a UE has an RAT restriction, a forbidden area, an allowed area, a non-allowed area or an area overlapping between them, the UE performs an operation according to the following priority:

The evaluation of the RAT restriction has precedence over the evaluation of any other mobility restriction;

The evaluation of the forbidden area has precedence over the evaluation of the allowed area and the non-allowed area; and The evaluation of the non-allowed area has precedence over the evaluation of the allowed area.

4) Mobile Initiated Connection Only (MICO) Mode

A UE may indicate the preference of the MICO mode during initial registration or registration update. The AMF determines whether the MICO mode is permitted for the UE based on a local configuration, the preference indicated by the UE, UE subscription information and a network policy or a combination of them, and notifies the UE of the results during a registration procedure.

A UE and a core network re-initiates or exits from the MICO mode in the following registration signaling. If the MICO mode is not clearly indicated within a registration procedure and a registration procedure is successfully completed, the UE and the AMF do not use the MICO mode. That is, the UE operates as a general UE, and the network also treats a corresponding UE as a general UE.

The AMF allocates a registration area to a UE during a registration procedure. When the AMF indicates the MICO mode for the UE, the registration area is not restricted as a paging area size. If the AMF serving area is the whole PLMN, the AMF may provide the UE with the "whole PLMN" registration area. In this case, re-registration with the same PLMN attributable to mobility is not applied. If a mobility restriction is applied to a UE in the MICO mode, the AMF allocates an allowed area/non-allowed area to the UE.

When the AMF indicates the MICO mode for the UE, the AMF considers that the UE is always unreachable during the CM-IDLE state. The AMF rejects any request for downlink data transfer for a corresponding UE that is in the MICO mode and the CM-IDLE state. The AMF also delays downlink transport, such as SMS or location service through the NAS. A UE in the MICO mode may be reachable for mobile-terminated data or signaling only when the UE is in the CM-CONNECTED mode.

The AMF may provide an RAN node with pending data indication when a UE in the MICO mode can immediately transport mobile-terminated data and/or signaling when the UE switches to the CM-CONNECTED mode. When the RAN node receives the indication, the RAN node considers the information when it determines user inactivity.

A UE in the MICO mode does not need to listen to paging during the CM-IDLE state. The UE in the MICO mode may stop any AS procedure within the CM-IDLE state until it starts switching from the CM-IDLE to the CM-CONNECTED mode due to one of the following reasons.

When a change (e.g., configuration change) within the UE requires registration update to a network When a periodic registration timer expires When MO data is pending When MO signaling is pending Quality of Service (QoS) Model QoS is a technology for the smooth transfer service of various traffic (mail, data transmission, audio and video) to a user depending on each character.

A 5G QoS model supports a framework-based QoS flow. The 5G QoS model supports both a QoS flow that requires a guaranteed flow bit rate (GFBR) and a QoS flow that does not require the GFBR.

The QoS flow is the finest granularity for QoS classification in a PDU session.

A QoS flow ID (QFI) is used to identify a QoS flow within a 5G system. The QFI is unique within a PDU session. User plane traffic having the same QFI within a PDU session receives the same traffic transfer processing (e.g., scheduling and an admission threshold). The QFI is transferred within an encapsulation header on N3 (and N9). The QFI may be applied to a different payload type of a PDU (i.e., an IP packet, unstructured packet and Ethernet frame).

In this specification, for convenience of description, "QoS" and a "QoS flow" are interchangeably used. Accordingly, in this specification, "QoS" may be construed as meaning a "QoS flow", and "QoS" may be construed as meaning a "QoS flow."

Within a 5G system, QoS flows may be controlled by an SMF upon PDU session setup or QoS flow establishment/modification.

If applicable, all of QoS flows have the following characteristics:

QoS profile previously configured in the AN or provided from the SMF to the AN via the AMF through the N2 reference point;

One or more networks provided from the SMF to the UE via the AMF through the N1 reference point—provided QoS rule(s) and/or one or more UE-derived QoS rule(s)

SDF classification provided from the SMF to the UPF through the N4 reference point and QoS-related information (e.g., session-aggregate maximum bit rate (AMBR)).

The QoS flow may become a "guaranteed bit rate (GBR)" or a "non-guaranteed bit rate (non-GBR)" depending on the QoS profile. The QoS profile of the QoS flow includes the following QoS parameters:

i) With respect to each of QoS flows, QoS parameters may include the followings:

5G QoS indicator (5QI): the 5QI is a scalar for referring to 5G QoS characteristics (i.e., control QoS transfer handling access node-specific parameters for a QoS flow, for example, scheduling weight, an admission threshold, a queue management threshold and a link layer protocol configuration).

Allocation and retention priority (APR): the ARP includes a priority level, a pre-emption capability and pre-emption vulnerability. The priority level defines the relative importance of a resource request. This is used to determine whether a new QoS flow will be accepted or rejected if resources are restricted and to used to determine whether the existing QoS flow will pre-empt resources while the resources are restricted.

ii) Furthermore, only in the case of each GBR QoS flow, QoS parameters may further include the followings:

GFBR—the uplink and downlink;

Maximum flow bit rate (MFBR)—the uplink and downlink; and

Notification control.

iii) Only in the case of a non-GBR QoS flow, QoS parameters may further include the following: Reflective QoS attribute (RQA)

There are supported methods of controlling the following QoS flows:

1) In the case of the non-GBR QoS flow: if a standardized 5QI or a previously configured 5QI is used, a 5QI value is used as the QFI of the QoS flow and a default ARP is previously configured in the AN;

2) In the case of the GBR QoS flow: if a standardized 5QI or a previously configured 5QI is used, a 5QI value is used as the QFI of the QoS flow. A default ARP is transmitted to the RAN when a PDU session is established. Whenever the NG-RAN is used, the user plane (UP) of the PDU session is activated;

3) In the case of the GBR and non-GBR QoS flow: an allocated QFI is used. A 5QI value may be standardized, previously configured or not standardized. The QoS profile and QFI of the QoS flow may be provided to the (R)AN through N2 when a PDU session is established or when a QoS flow is established/changed. Whenever the NG-RAN is used, the user plane (UP) of the PDU session is activated.

A UE may perform the marking and classification (i.e., the association of UL traffic for a QoS flow) of UL user plane traffic based on a QoS rule. Such rules may be explicitly provided to the UE (when a PDU session is established or a QoS flow is established) or may have been previously configured in the UE or may be implicitly derived by the UE by applying reflective QoS.

The QoS rule may include a unique QoS rule ID within a PDU session, the QFI of an associated QoS flow, and one or more packet filters and precedence value. Additionally, with respect to an allocated QFI, the QoS rule may include QoS parameters related to a UE. One or more QoS rules associated with the same QoS flow (i.e., having the same QFI) may be present.

The default QoS rule may be necessary for all of PDU sessions. The default QoS rule may be a unique QoS rule of a PDU session that may not include a packet filter (In this case, the highest precedence value (i.e., the lowest priority) must be used). If the default QoS rule does not include a packet filter, the default QoS rule defines the processing of packets not matched with another QoS rule in a PDU session.

The SMF performs binding between SDFs for a QoS flow depending on the QoS of an SDF and service requirements. The SMF allocates a QFI to a new QoS flow, and derives the QoS parameter of the new QoS flow from information provided by the PCF. If applicable, the SMF may provide an (R)AN with a QFI along with a QoS profile. The SMF provides an SDF template (i.e., a set of packet filters associated with the SDF received from the PCF) along with SDF priority, QoS-related information and corresponding packet marking information (i.e., a QFI, a differentiated services code point (DSCP) value and optionally enables the classification, bandwidth application and marking of user plane traffic using reflective QoS indication for a UPF). If applicable, the SMF generates QoS rule(s) for a PDU session by allocating unique QoS rule IDs within a PDU session to which the QFI of a QoS flow has been added, configuring packet filter(s) for the UL part of the SDF template, and setting QoS rule priority in the SDF priority. The QoS rule is provided to a UE that enables the classification and marking of UL user plane traffic.

FIG. 12 illustrates classification and user plane marking for a QoS flow and the mapping of a QoS flow to AN resources according to an embodiment of the present invention.

1) Downlink

An SMF allocates a QFI for each QoS flow. Furthermore, the SMF derives QoS parameters from information provided by a PCF.

The SMF provides an (R)AN with the QFI along with a QoS profile including the QoS parameters of a QoS flow. Furthermore, when a PDU session or QoS flow is established, the QoS parameters of the QoS flow is provided to the (R)AN as the QoS profile through N2. Furthermore, whenever an NG-RAN is used, a user plane is activated. Furthermore, QoS parameters may be previously configured in the (R)AN for a non-GBR QoS flow.

Furthermore, the SMF provides an UPF with an SDF template (i.e., a set of packet filters associated with the SDF received from the PCF) along with SDF preference and a corresponding QFI so that the UPF can perform the classification and marking of a downlink user plane packet.

Downlink inflow data packets are classified based on the SDF template according to the SDF preference (without the initiation of additional N4 signaling). A CN classifies user plane traffic belonging to a QoS flow through N3 (and N9) user plane marking using the QFI. The AN binds the QoS flow with AN resources (i.e., a DRB in the case of the 3GPP RAN). In this case, a relation between the QoS flow and the AN resources is not restricted to 1:1. The AN may configure the AN resources necessary to map a QoS flow to a DRB so that a UE may receive the QFI (and reflective QoS may be applied).

If matching is not discovered, when all of QoS flows are related to one or more DL packet filters, the UPF may discard a DL data packet.

Characteristics applied to process downlink traffic are as follows:

The UPF maps user plane traffic to the QoS flow based on the SDF template.

The UPF performs session-AMBR execution and performs PDU counting for charging support.

The UPF may transmit the PDUs of a PDU session in a single tunnel between 5GC and the (A)AN, and the UPF may include the QFI in an encapsulation header.

The UPF performs transmission level packet marking in the downlink (e.g., sets DiffServ code in an outer IP header). Transmission level packet marking is based on 5QI and the ARP of an associated QoS flow.

The (R)AN maps PDUs from a QoS flow to access-specific resources based on a QFI, related 5G QoS characteristics and parameters by considering an N3 tunnel associated with a downlink packet.

If reflective QoS is applied, a UE may generate a new derived QoS rule (or may be called a "UE-derived QoS rule"). A packet filter within the derived QoS rule may be derived from a DL packet (i.e., the header of the DL packet). The QFI of the derived QoS rule may be configured depending on the QFI of the DL packet.

2) Uplink

The SMF generates QoS rule(s) for a PDU session by allocating a QoS rule ID, adding the QFI of a QoS flow, setting packet filter(s) in the uplink part of an SDF template, and setting QoS rule precedence in SDF precedence. The SMF may provide a UE with the QoS rules in order for the UE to perform classification and marking.

The QoS rule includes a QoS rule ID, the QFI of a QoS flow, one or more packet filters and preference values. The same QFI (i.e., the same QoS flow) and one or more QoS rules may be associated.

A default QoS rule is required for each PDU session. The default QoS rule is the QoS rule of a PDU session not including a packet filter (In this case, the highest precedence value (i.e., the lowest priority) is used). If the default QoS rule does not include a packet filter, the default QoS rule defines the processing of a packet not matched with any another QoS rule within the PDU session.

A UE performs the classification and marking of uplink user plane traffic. That is, the UE associates uplink traffic with the QoS flow based on the QoS rule. The rule may be explicitly signaled through N1 (when a PDU session is established or when a QoS flow is established or may be previously configured in the UE or may be implicitly derived by the UE from reflected QoS.

In the UL, a UE evaluates an UL packet with respect to the packet filter of the QoS rule based on the precedence value of the QoS rule (i.e., in order of increasing precedence value) until a matching QoS rule (i.e., the packet filter is matched with the UL packet) is discovered. The UE binds the UL packet to the QoS flow using a QFI in the corresponding matching QoS rule. The UE binds the QoS flow and the AN resources.

If matching is not discovered and a default QoS rule includes one or more UL packet filters, a UE may discard an UL data packet.

Characteristics applied to process uplink traffic are as follows:

A UE may use stored QoS rules in order to determine mapping between UL user plane traffic and a QoS flow. The UE may mark an UL PDU with the QFI of a QoS rule including a matching packet filter, and may transmit the UL PDU using corresponding access-specific resources for a QoS flow based on mapping provided by an RAN.

The (R)AN transmits the PDU through an N3 tunnel with respect to an UPF. When an UL packet passes through a CN from the (R)AN, the (R)AN includes a QFI in the encapsulation header of the UL PDU and selects the N3 tunnel.

The (R)AN may perform transmission level packet marking in the uplink. The transmission level packet marking may be based on the ARP of a QoS flow associated with a 5QI.

The UPF checks whether the QFIs of UL PDUs are provided to the UE or are aligned (e.g., in the case of reflective QoS) with QoS rules implicitly derived by the UE.

The UPF performs session-AMBF execution and counts a packet for charging.

In the case of an UL classifier PDU session, UL and DL session-AMBRs need to be performed on an UPF that supports an UL classifier function. Furthermore, the DL session-AMBR needs to be separately performed in all of UPFs that terminate an N6 interface (i.e., an interaction between UPFs is not required).

In the case of a multi-home PDU session, UL and DL session-AMBRs are applied to an UPF that supports a branch point function. Furthermore, the DL session-AMBR needs to be separately performed in all of UPFs that terminate the N6 interface (i.e., an interaction between UPFs is not required).

The (R)AN needs to perform a maximum bit rate (UE-AMBR) restriction in the UL and DL for each non-GBR QoS flow. When the UE receives a session-AMBR, it needs to perform a PDU session-based UL rate restriction for non-GBR traffic using the session-AMBR. The rate restriction execution for each PDU session is applied to a flow that does not require a guaranteed flow bit rate. The MBR per SDF is mandatory to a GBR QoS flow, but is optional for a non-GBR QoS flow. The MBR is performed in the UPF.

QoS control for an unstructured PDU is performed in a PDU session level. When the PDU session is established for the transmission of the unstructured PDU, the SMF provides the UPF and the UE with a QFI to be applied to any packet of the PDU session.

Mobility State Framework

It is expected that in 5G/NR/NextGen, an RRC inactive mode will be additionally introduced in addition to the RRC connected mode/RRC idle mode.

A next-generation core network needs to take into consideration a state machine envisioned for an RRC protocol within a new RAT. A mobility state machine for RRC may be proposed to have an inactive connected state (in addition to the RRC connected state and the RRC idle state). A need for a possible configuration for the RRC inactive connected state may be motivated through some factors that require flexibility, such as various needs of 5G use cases, future guarantee, and market needs for a new service.

In the next-generation core network viewpoint, when a UE is an RRC inactive connected state in the RRC layer, the UE is considered to be in the NG CM-CONNECTED state. When the UE makes transition between the RRC connected state and the RRC inactive connected state, a core network cannot recognize such a transition because signaling to the core network is not present. Furthermore, the core network does not page the UE when the UE is in the RRC inactive connected state because a control plane and a user plane have been set up between an RAN and the core.

The characteristics of the RRC inactive connected state include the followings:

A UE is considered to be the NG CM-CONNECTED state in the UE and CN.

Configurable to provide service requested by a UE. This means that the RRC inactive connected state may be configured by taking into consideration the requirements and characteristics of an application being executed in a UE, subscription information, and UE activity. The core network needs to provide related information to the RAN.

UE based mobility inspired by a cell reselection procedure with a configuration from a network, network-controlled handover is not supported.

When a UE moves to the outside of a registration area, the UE performs area registration on the CN.

Access stratum (AS) context is stored in the RAN and the UE.

In Rel-13, transition from the RRC inactive connected state, inspired by a suspend and resume procedure for LTE, to the RRC connected state. Furthermore, in order to perform such a transition, any signaling for the CN is not necessary. AS context needs to be transmitted between RAN nodes.

The establishment of a user (U)-plane and control (C)-plane connection between the RAN and the core is maintained.

UE reachability is managed by the RAN with the help of the core network.

UE paging is managed by the RAN.

The CN makes transition to the NG-CM IDLE state upon RAN request.

Distributed mobility management—a network follows a UE in a CN level.

Rx/Tx data is not performed in this state.

In order to support LTE and NR deployment as an efficient method, when a UE makes transition between the NR and Evolved E-UTRA in the inactive state, a solution for state transition can avoid or minimize UE signaling.

FIG. 13 illustrates an NG RRC/CM/MM state transition diagram to which the present invention may be applied.

This drawing shows how the above-proposed RRC state machine is fit into the NG CM/MM state machine model when the RRC inactive connected state is used.

Referring to FIG. 13, the state transition may be described as follows:

(1) First, when power is on, a UE performs PLMN/cell selection and camps on a proper cell. In this case, the UE enters an NG MM DEREGISTERED state corresponding to an RRC idle state.

(2) Next, the UE is registered with (attaches to) a network, and performs connection setup. In this case, the UE may enter an NG MM REGISTERED NG CM CONNECTED state corresponding to an RRC connected state and an RRC inactive connected state.

(3) Next, the UE makes transition (from the RRC connected state) to an RRC inactive connected state due to inactivity.

(4) MT/MO trigger for data transmission makes transition (from the RRC inactive connected state) to an (RRC) connected state for transmission and reception.

(5) Detach/power off. In this case, the UE may return to the NG MM DEREGISTERED state corresponding to the RRC idle state.

(6) connection setup/release

Generic UE Configuration Update Procedure

This procedure may be used for the AMF to change a UE configuration. If the AMF attempts to update a UE configuration that requires acknowledgement (ACK), an update procedure described later in relation to FIG. 14 may be used. If the AMF attempts to update a UE configuration that does not require UE ACK, an update procedure described later in relation to FIG. 15 may be used.

In relation to FIGS. 14 and 15, TS 23.502 v.1.3.0 may be merged into this specification.

All UE parameters affecting a different NF (e.g., SMF, RAN) are updated through a registration procedure instead of this update procedure.

FIG. 14 is a diagram illustrating a UE configuration update procedure having ACK to which the present invention may be applied.

0. An AM may determine a need for a UE configuration change for various causes (e.g., a mobility change of a UE, a network (NW) policy, a UE subscription information change). If the UE is in CM-IDLE, the AMF may trigger a network-triggered service request (Section 4.2.3.4 of TS 23.502 v.1.3.0).

1. The AMF may transmit, to the UE, a UE configuration update command including a UE parameter(s).

2. The UE may transmit a UE configuration update complete message to the AME After the UE receives the UE configuration update, the update of a specific parameter (e.g., a new TAI list does not include the camping tracking area (TA) of the UE) may trigger a registration update procedure by the UE.

FIG. 15 is a diagram illustrating a UE configuration update procedure not having ACK to which the present invention may be applied.

0. The AMF may determine a need for a UE configuration change for various causes (e.g., a mobility change of a UE, a network (NW) policy, a UE subscription information change). If the UE is in CM-IDLE, the AMF may trigger a network-triggered service request (Section 4.2.3.4 of TS 23.502 v.1.3.0).

1. The AMF may transmit a UE configuration update command to the UE.

Most of the parameters/information of the UE are provided/updated through a registration procedure (initial/mobility/periodic), but the generic UE configuration update procedure described above in relation to FIGS. 14 and 15 may be necessary when a network wants to update/provide UE parameters/information without depending on a UE registration triggering condition.

Table 2 shows UE information/parameters which may be provided and updated (i.e., managed) by a network.

TABLE 2

| Information | Providing NF | Whether Ack is necessary | Other NF impact |
| --- | --- | --- | --- |
| Temporary UE ID, TA List | AMF | Yes | No |
| Permitted S-NSSAI information | | Yes | No |
| Mobility restriction | | Yes | In connected mode, RAN (necessary to provide handover restriction list) |
| MICO handling | | Yes | Only MICO off is possible (only in connected mode), Impact of RRC-inactive & DRX function, necessary to activate buffering in UPF |
| Network Identity and Time Zone (NITZ) information | | Yes | No |
| Access network search and selection policy | PCF | Yes | No |
| UE Route Selection Policy (URSP) | | Yes | No |

Four different category uses for the generic UE configuration update procedure may be monitored based on Table 2.

1) Information/Parameters which are Generated by the AMF without any Other NFs Impact:

A temporary UE ID, a tracking area (TAI) list, and slice information are generated/determined by the AMF, and may be forwarded using the generic UE configuration update procedure without an impact on a different NF. The information/parameter requires UE Ack.

A network ID and a time zone may also be forwarded using this procedure. In this case, however, Ack of the UE is not required.

2) Information/Parameters which are Generated by the AMF with Simple Impact to the RAN Only:

Mobility restriction (i.e., permission/non-permission TA information) is generated by the AMF, and may be forwarded using the generic UE configuration update procedure. If this procedure 가 is triggered when the UE is in the CM-CONNECTED state, the AMF may additionally provide a handover restriction list.

3) Information/Parameters which are Provided by the AMF with Impact to the RAN, and Other NFs:

If a network wants UE reachability according to paging to be enabled timely, to disable MICO may be necessary. However, a UE applying the MICO mode cannot perform registration update for a long time. The reason for this is that mobility registration does not occur because all PLMNs have been assigned for the corresponding UE, and periodic registration may not occur because a NW can lengthily assign the period of a period registration timer. Accordingly, when the UE is in the CM-connected state, a mechanism for activating the paging (escape from the MICO mode) of the UE is necessary (based on mobile originated transaction).

When the AMF disables the MICO mode, the UE, the RAN, and the SMF/UPF are impacted. The applicability of RRC-inactive, DRX negotiation, a periodic registration timer, and buffering may be impacted by this change (i.e., disable MICO). Accordingly, a registration update procedure is more appropriate because a sourcing company understands that MICO is disabled. Accordingly, a "disable MICO mode" parameter must be materialized, and a generic UE configuration update message may include the "Disable MICO mode" parameter. When the UE receives a generic UE configuration update message indicating "Disable MICO mode", the UE needs to trigger a registration update procedure.

4) Information/Parameters are Provided by the PCF without any Other NFs Impact:

In 5GC, the PCF may provide information (access network search & selection policy & UE route selection policy (URSP)) to a UE through the AME This UE policy information is transparent by the AMF.

This UE policy information may be forwarded using the generic UE configuration update procedure including a "policy message container". In order to forward such policy information, UE Ack is necessary.

As a result, this specification additionally proposes that the four category uses should be supported using such generic UE configuration update. Modified embodiments of FIGS. 14 and 15 updated accordingly are described later in FIGS. 16 and 17.

The generic UE configuration update procedure may be used for the AMF to change a UE configuration. If the AMF wants to update a UE configuration that requires acknowledgement (ACK), an update procedure described later in relation to FIG. 16 may be used. If the AMF wants to update a UE configuration that does not require UE ACK, an update procedure described later in relation to FIG. 17 may be used.

In relation to FIGS. 16 and 17, TS 23.502 v.1.3.0 may be merged into this specification.

FIG. 16 is a diagram illustrating a UE configuration update procedure having ACK to which the present invention may be applied.

1a. UDM may change UE subscription information, such as mobility restriction information.

1b. The PCF may transmit UE policy information to the AMF so that the UE policy information (access network search & selection policy and/or URSP) is forwarded to the UE.

2. The AMF may determine a need for a UE configuration change for various causes (e.g., a UE mobility change, an NW policy, a UE subscription information change). If the UE is in CM-IDLE, the AMF triggers a network trigger service request (Section 4.2.3.4 of TS 23.502 v.1.3.0). The AMF may transmit, to the UE, a UE configuration update command including UE parameters (temporary user ID, a TAI list, an NSSAI, mobility restriction, an MICO inactive mode, a policy message container). If the AMF wants to update such information, the AMF may include a temporary user ID, a TAI list, mobility restriction information or NSSAI information. If the AMF wants to disable the MICO mode of the UE which has been previously enabled, the AMF may also include the Disable MICO mode. If this procedure is triggered and the AMF updates mobility restriction during the CM-connected state, the AMF needs to provide a handover restriction list to the RAN. The AMF also includes a policy message container in step 1b.

3a. The UE transmits a UE configuration update complete message to the AMF unless the UE receives the Disable MICO mode in step 2.

3b. The UE transmits a registration update message to the AMF when it receives the disable MICO mode in step 2. After the UE receives the UE configuration update command, the update of a specific parameter may trigger a registration update procedure by the UE.

FIG. 17 is a diagram illustrating a UE configuration update procedure not having ACK to which the present invention may be applied.

0. The AMF may determine a need for a UE configuration change for various causes (e.g., a mobility change of a UE, a network (NW) policy, a UE subscription information change). If the UE is in CM-IDLE, the AMF may trigger a network-triggered service request (Section 4.2.3.4 of TS 23.502 v.1.3.0).

1. The AMF may transmit a UE configuration update command network identity and time zone (NITZ).

Efficient tracking area update (TAU) method in which session and service continuity (SSC) mode is taken into consideration Currently, in 3GPP SA2, the SSC mode for supporting service continuity has been defined as follows (TR 29.799 v2.0.0).

SSC mode 1 (or first SSC mode): the same terminating user plane function (TUPF) is maintained regardless of an access technology (e.g., RAT and cell) used by a UE for network access.

SSC mode 2 (or second SSC mode): the same TUPF is maintained with respect to only a subset of an attachment point (e.g., cell and RAT) called the serving area of the TUPF (or may be referred to as a "service area"). If a UE leaves the serving area of a TUPF, the UE may be served by another TUPF suitable for a new attachment point of the UE for a network.

The serving area of the TUPF may be restricted to only a single cell (e.g., in the case of a stationary UE).

SSC mode 3 (or third SSC mode): in this mode, a network enables establishment through a new TUPF for the same data network (DN) although a connection between a UE and a previous TUPF has not yet been terminated. If a trigger condition is applied, a network may select a target TUPF suitable for a new attachment point of a UE for the network. While both TUPFs are active, the UE may rebind an application to a new address/prefix before, or the UE may wait for flows bound to the previous address/prefix to end.

If the above-described contents are followed, in the SSC mode 1, an IP anchor (may also be referred to as a "PDU session anchor") is not changed. In the SSC mode 2, an IP anchor is maintained only within a specific serving area. In the SSC mode 3, if an IP anchor needs to be changed, two PDU sessions may be present in parallel at the same time through a previous IP anchor and a new IP anchor, respectively.

As described above in relation to FIG. 6, in the 5G/NR/NextGen system, it has been defined that management for mobility is performed by the AMF and management for a session is performed by the SMF. That is, mobility management (AMF) and session management (SMF) are separated. Accordingly, the AMF does not have information for the session of a UE, and may have only routing information for forwarding a session-related message, simply transmitted by the UE, to the SMF. The SMF has all types of information for the session of a UE, and should receive mobility information from the AMF if mobility information for a UE is necessary.

In EPC, the MME has managed both mobility and a session. However, in NextGen, the function of the MME is separated into the AMF and the SMF, wherein the AMF manages/is responsible for mobility, and the SMF manages/is responsible for a session. As a result, the AMF assigns a tracking area for managing the mobility of a UE to the UE, and manages the tracking area. The AMF does not store/manage information for a session because it does not manage a session. Accordingly, the AMF can be aware of whether a session is present, but is unaware of detailed information, such as type information or IP address of the session.

A problem lies in a newly defined SSC mode in NextGen. In the SSC mode 1, the same method as the existing EPC may be borrowed and used because the UPF responsible for an IP anchor should not be always changed. However, in the case of the SSC mode 2, when a UE is out of the serving area of the UPF (i.e., the serving area of a PDU session), the SMF needs to be always aware of location information of the UE because a new UPF must be assigned to the UE. The serving area of the UPF is the area within which a PDU session associated with the UPF can be served by the (R)AN nodes via a N3 interface between the (R)AN and the UPF without the need to add a new UPF in between or to remove/reallocate the UPF. The serving area of the UPF may be previously pre-defined (may be defined by an operator), and serving areas may be different or may be partially overlapped for each UPF.

When a UE is in the connected mode, there is no problem in the support of the SSC mode 2 because a network can be always aware of the location of the UE in a cell unit. However, when a UE is in the inactive mode or the idle mode, a network can be aware of the location of the UE only in a tracking area unit (i.e., cannot be aware of the location of the UE in the serving area unit of the UPF). Accordingly, if the serving area of the UPF and the tracking area have not been aligned/matched (at least the boundary of the UPF serving area and the boundary of the tracking area must be aligned/matched), although the UE is out of the serving area of the UPF in the inactive mode or the idle mode, there may be a problem in that the network does not update the UPF of the UE at proper timing because the network recognizes that the UE has been out of the serving area of the UPF. As a result, the SSC mode 2 may not be properly supported.

Accordingly, there is hereinafter proposed a method for aligning/matching the tracking area of a UE and the serving area of the UPF in order to prevent the above-described problem and to update the UPF of the UE at proper timing.

When the SMF receives, from a UE, a PDU session creation request to which the SSC mode 2 has been applied and thus creates a PDU session in the SSC mode 2, the SMF notifies the AMF of the creation/presence of the PDU session to which the SSC mode 2 has been applied. In this case, the SMF may additionally notify the AMF of serving area information of the corresponding PDU session (or may be referred to as "serving area information of a UPF"). Such notification may be forwarded to the AMF through a PDU session response (Create PDU Session Response) message transmitted from the SMF to the UE, or may be forwarded to the AMF through a separate different message.

The AMF that has received indication providing notification of the presence of the PDU session of the SSC mode 2 from the SMF may assign a new tracking area to the UE. In this case, the AMF may assign a tracking area suitable for the UE by taking into consideration information for the serving area of the UPF transmitted by the SMF based on pre-configured information. That is, the AMF needs to assign a tracking area to the UE so that when the UE is out of the serving area of the UPF, the UE can recognize that it has been out of a tracking area assigned thereto and can perform a TAU procedure for updating a tracking area. For example, the AMF may newly assign at least one tracking area, aligned/matched/corresponding (or included in the serving area of the UPF) to the serving area of the UPF, but not assigned to the UE, to the UE, by comparing the serving area of the UPF and a tracking area now assigned to the UE. In this case, the AMF needs to assign the tracking area so that the UE can perform TAU when it is out of the serving area of the UPF. To this end, the AMF may assign, to the UE, a tracking area smaller than the serving area of the UPF. The newly assigned tracking area may be updated by a TAU procedure and may be included and managed in a TAI list.

More detailed description regarding this solution is given in detail below with reference to FIG. 19.

FIG. 18 is a diagram illustrating a tracking area assignment method by the AMF according to an embodiment of the present invention. More specifically, FIG. 18 illustrates a tracking area assignment method by the AMF if a PDU session to which the SSC mode 2 has been applied is not established and a PDU session to which the SSC mode 2 has been applied is subsequently established.

In a conventional technology, the AMF may assign a tracking area to a UE only when the UE attaches a network or performs TAU. That is, a TAU procedure can be performed only when the UE is triggered. However, as described above, for the alignment/matching between the serving area of the UPF and a tracking area, in a new system, it may be defined that the AMF can also trigger TAU as follows.

1. Referring to FIG. 18, first, a UE may receive, from the AMF, a TAI list including information on a tracking area assigned in an attach approval or TAU procedure, and may store/manage the TAI list. In this case, the tracking area cannot be assigned to the UE regardless of the serving area of the UPF because the UE does not have the PDU session of the SSC mode 2. The TAI list may be chiefly used to notify an (R)AN of a TA in which a paging message must be broadcasted.

2-4. If the UE determines that the creation of a new PDU session to which the SSC mode 2 has been applied, such as that a new application is executed, is necessary, the UE may request the creation of the PDU session from the SME To this end, the UE may transmit, to the SMF, a PDU session creation request message (or may be abbreviated as a "PDU session creation request") including SSC mode indication information indicating the SSC mode 2. The SMF may determine to create the PDU session in the SSC mode 2, may perform IP-CAN setup in the SSC mode 2 along with the PCF, may set up an UP route along with the UPF, and may set up a user plane route.

5. The SMF may transmit, to the AMF, information on the newly created/set up PDU session (hereinafter referred to as "PDU session information"). The PDU session information may include information indicating that the PDU session of the SSC mode 2 has been created/set up for the UE. Furthermore, the PDU session information may additionally include serving area information of a serving UPF (UPF associated/corresponding to the newly created/set up PDU session and/or to which the newly created/set up PDU session has been assigned). A message including such PDU session information may be indication of the SMF for the AMF indicating that new tracking area assignment is necessary. A cause value configured to additionally indicate that the "PDU session of the SSC mode 2 has been created" may be included in such indication and transmitted to the AMF Alternatively, the SMF may simply notify the AMF of address/ID information of an assigned UPF (i.e., serving UPF) without explicitly transmitting serving area information of the serving UPF to the AMF. In this case, the AMF may fetch serving area information of the corresponding UPF (i.e., UPF corresponding to address/ID information of a UPF received from the SMF) that is pre-configured/stored in the AMF Furthermore, the SMF does not transmit, to the AMF, indication indicating that new TA assignment is necessary, but the AMF may compare the TA list (transmitted to the UE in step 1) (i.e., TA previously assigned to the UE) and the serving area of the serving UPF, based on UPF information (e.g., a UPF serving area, a UPF address and/or a UPF ID) autonomously/directly received from the SMF. Accordingly, the AMF may determine whether TA update (or the assignment of a new TA to the UE) for matching/alignment between the serving area of the serving UPF and the TA pre-assigned to the UE is necessary. If the serving area of the serving UPF and the TA pre-assigned to the UE are not aligned/matched, the AMF may initiate/perform a TA update procedure for alignment/matching (i.e., perform step 7). In this specification, the case where the serving area of the serving UPF and the pre-assigned TA are not aligned/matched may correspond to a case where at least one TA included in the serving area, but not yet assigned to the UE is present and/or a case where at least one TA is present, which may be recognized that the UE has been out of the TA although the UE has been out of the serving area.

If a plurality of PDU sessions has been created/established as the SSC mode 2, a different UPF may be assigned/associated/correspond to each PDU session, but the serving area may be different for each UPF. Accordingly, a TA (or TA list) that must be newly assigned to the UE by the AMF may be different for each UPF or PDU session. Accordingly, in this case, how the AMF should assign the TA (or write/update the TA list) based on which UPF serving area may be ambiguous. In order to solve such ambiguity, the SMF may additionally transmit, to the AMF, priority value/information for each PDU session along with PDU session information. Such priority value/information may be determined by the DNN/S-NSSAI or policy of a PDU session.

When the AMF receives the priority value/information from the SMF, the AMF assigns the TA (or write/update the TA list) by taking into consideration the UPF serving area of a PDU session having high priority. If the AMF has not received any priority value/information from the SMF or has a PDU session having the same priority, the AMF may assign the TA (or write/update the TA list) so that the UE can recognize that it has been out of each UPF serving area (i.e., intersection between UPF serving areas is supported). Such a TA assignment (or TA list write/update) operation may be performed in a TAU procedure of step 7 to be described later.

Such priority value/information may have been pre-configured in the AMF or may have been stored in subscription information.

6. The SMF that has finished all the PDU session setup procedure may transmit, to the UE, indication information providing notification that the PDU session of the SSC mode 2 has been created. Such indication information may be transmitted to the UE through a PDU session creation response message (may be abbreviated as a "PDU session creation response"). This step may be performed along with/at the same time with step 5.

7. The AMF transmits, to the UE, indication to start TAU based on the indication information transmitted by the SMF (i.e., trigger a TAU procedure). More specifically, the AMF may trigger the TAU procedure if the AMF determines that new TA assignment is necessary for alignment with the serving area of the serving UPF based on the PDU session information received from the SMF.

When the UE receives the indication to start TAU from the AMF, the UE starts/performs the TAU procedure. The AMF assigns a new TA to the UE through the corresponding TAU procedure. In this case, the AMF may assign the TA (or update a TAI list) with reference to the serving area information of the UPF transmitted by the SMF, based on information pre-configured/stored in the AMF. In this case, the AMF needs to assign the TA (or update the TAI list) so that the UE can perform/request TAU (or so that the serving area of the UPF and the TA are aligned/matched) when the UE is out of the serving area of the UPE Alternatively, the AMF does not transmit the indication to start TAU, but in step 6, the SMF may transmit the indication to start TAU while transmitting the PDU creation request.

Alternatively, the SMF may transmit, to the UE, the serving area information of the serving UPF through the PDU creation request. In this case, the UE may autonomously determine whether the TA needs to be assigned (or TAI list needs to be updated) by directly determining whether the serving area of the serving UPF and the TA are aligned/matched through a comparison between the received serving area information and the TAI list received in step 1. If the UE determines that a new TA needs to be assigned (or a TAI list needs to be updated), the UE may request TAU (or initiate a TAU procedure) for updating the TA.

For the execution of step 7 (i.e., a new TA assignment/TAU procedure for the UE), the "generic UE configuration update procedure" described above in relation to FIGS. 14 to 17 may be used.

As described above, when the assignment of the TA (or TAI list update) aligned/matched with the serving area of the UPF is completed through the TAU procedure, the UE requests TAU from the AMF whenever the UE is out of a TA now assigned thereto. A new UPF/PDU session may be properly created/updated through such a TAU.

A method of managing, by a network, a UPF serving area has been described above. However, the present invention is not limited thereto. There may be a method for a UE to perform TAU when it is out of a UPF serving area when a network directly notifies the UE of UPF serving area information (e.g., the SMF transmits, to the UE, serving area information of a UPF through a PDU session creation response). In this case, alignment/matching between the serving area of the UPF and a TA may be unnecessary. When the UE is out of the serving area of the UPF, the UE may include indication, providing notification that it has been out of the UPF serving area, in a TAU request message while requesting TAU from the AMF. When the AMF receives the TAU request including such indication, the AMF may forward the indication, providing notification that the UE has been out of the UPF serving area, to the SMF while forwarding location information of the UE. Accordingly, when the SMF recognizes that the UE has been out of the serving area, it may release the existing PDU session, and may perform a procedure of updating/creating a new UPF/PDU session.

FIG. 19 is a flowchart illustrating a tracking area assignment method by the AMF according to an embodiment of the present invention. The embodiments described above in relation to this flowchart may be applied identically/similarly, and a redundant description is omitted.

First, the AMF may receive SSC mode indication information for a PDU session, created/established for a UE, from the SMF (S1910). In this case, the SSC mode indication information may indicate at least one SSC mode (e.g., SSC mode 2) to be applied to the created/established PDU session, among a plurality of pre-defined SSC modes (e.g., the above-described SSC modes 1 to 3).

Next, the AMF may obtain serving area information for the serving area of a serving UPF associated (i.e., corresponding to a corresponding PDU session anchor) with the PDU session (S1920). The serving area information may be transmitted by the SMF or may be pre-configured in the AMF for each UPF. If the serving area information is transmitted by the SMF, the serving area information may be transmitted by the SMF as PDU session information along with SSC mode indication information. If the serving area information is pre-configured in the AMF for each UPF, the AMF may receive the address or ID of the serving UPF from the SMF. In this case, the AMF may obtain serving area information of a UPF corresponding to the address or ID of a serving UPF received from the SMF, among serving area information pre-configured in the AMF for each UPF.

Next, the AMF may determine whether the assignment of a new tracking area to the UE is necessary based on a tracking area pre-assigned to the UE and the serving area (S1930). More specifically, the AMF may determine whether the pre-assigned tracking area and the serving area have been aligned by comparing the pre-assigned tracking area and the serving area. The AMF may determine that the assignment of the new tracking area is unnecessary if the pre-assigned tracking area and the serving area have been aligned, and may determine that the assignment of the new tracking area is necessary if the pre-assigned tracking area and the serving area have not been aligned. Furthermore, whether the pre-assigned tracking area and the serving area have been aligned may be determined by the AMF based on whether the UE has been configured to perform TAU when the UE is out of the serving area. More specifically, the AMF may determine whether the pre-assigned tracking area and the serving area have been aligned based on whether a tracking area included in the serving area, but has not been assigned to the UE is present (i.e., whether a tracking area having a size equal to or smaller than the serving area has not been assigned to the UE within the corresponding serving area). If the UE has not been configured to perform TAU when it is out of the serving area (i.e., when a not-assigned tracking area is present), the AMF determines that the pre-assigned tracking area and the serving area have not been aligned. If the UE has been configured to perform TAU when it is out of the serving area (i.e., when a not-assigned tracking area is not present), the AMF may determine that the pre-assigned tracking area and the serving area have been aligned.

Next, if the AMF determines that the assignment of the new tracking area is necessary, it may perform tracking area update for the assignment of the new tracking area to the UE (S1940). In this case, the AMF may initiate/trigger the TAU procedure by transmitting, to the UE, indication triggering the tracking area update.

If the PDU session created for the UE is plural, the AMF may receive priority information for each created PDU session. Such priority information may be determined based on the DNN, S-NSSAI and/or policy of the PDU session. The AMF may determine whether the assignment of a new tracking area to the UE is necessary based on the serving area of a serving UPF, associated with a PDU session having high priority (e.g., the highest priority) based on the priority information, and a tracking area pre-assigned to the UE.

Alternatively, as another embodiment in which a PDU session created for the UE is plural, the AMF may determine whether the assignment of a new tracking area to the UE is necessary based on the serving area of serving UPFs associated with all of a plurality of PDU sessions and a tracking area pre-assigned to the UE. In this case, the priority information may not be separately signaled.

In the embodiments of FIGS. 18 and 19, a tracking area assignment method by the AMF has been described based on the case where the SSC mode 2 has been indicated, but the present invention is not limited thereto. That is, the tracking area assignment method by the AMF does not operate only in a specific SSC mode (i.e., SSC mode 2), and may also be performed in other SSC modes. Furthermore, tracking area assignment method may be variously expanded and applied to a case where alignment between the serving area of a UPF and the tracking area of a UE is necessary regardless/independently of whether an SSC mode has been applied.

According to an embodiment of the present invention, a UE requests TAU from the AMF whenever the UE is out of a TA now assigned thereto, and a new UPF/PDU session is created/updated at proper timing through such TAU. Accordingly, there is an effect in that the SSC mode 2 is supported although a UE is in an inactive mode or an idle mode.

Effects which may be obtained in the present invention are not limited to the above-described effects, and other technical effects not described above may be evidently understood by a person having ordinary skill in the art to which the present invention pertains from the following description.

What is claimed is:

1. A tracking area assignment method, by an access and mobility management function (AMF) in a wireless communication system, the method comprising:
   receiving, from a session management function (SMF), session and service continuity (SSC) mode indication information for a protocol data unit (PDU) session generated for a user equipment (UE);
   obtaining serving area information for a serving area of a serving user plane function (UPF) associated with the PDU session;
   determining an assignment of a new tracking area to the UE is necessary based on a tracking area pre-assigned to the UE and the serving area; and
   performing tracking area update for the assignment of the new tracking area to the UE if it is determined that the assignment of the new tracking area is necessary.

2. The method of claim 1,
   wherein determining whether the assignment of the new tracking area to the UE is necessary comprises:
   determining whether the pre-assigned tracking area and the serving area have been aligned by comparing the pre-assigned tracking area and the serving area; and
   determining that the assignment of the new tracking area is unnecessary if it is determined that the pre-assigned tracking area and the serving area have been aligned, and determining that the assignment of the new tracking area is necessary if it is determined that the pre-assigned tracking area and the serving area have not been aligned.

3. The method of claim 2,
   wherein determining whether the pre-assigned tracking area and the serving area have been aligned comprises:
   determining whether a tracking area included in the serving area, but not assigned to the UE is present; and
   determining that the pre-assigned tracking area and the serving area have not been aligned if it is determined that the not-assigned tracking area is present and determining that the pre-assigned tracking area and the serving area have been aligned if it is determined that the not-assigned tracking area is not present.

4. The method of claim 2, further comprising:
receiving, from the SMF, priority information for each generated PDU session if the PDU session generated for the UE is plural.

5. The method of claim 4,
wherein the priority information is determined based on a data network name (DNN), single network slice selection assistance information (S-NSSAI) and/or policy of the PDU session.

6. The method of claim 4,
wherein when the PDU session generated for the UE is plural, determining whether the assignment of the new tracking area to the UE is necessary comprises determining whether the assignment of the new tracking area to the UE is necessary based on a serving area of a serving UPF, associated with a PDU session having high priority based on the priority information, and the tracking area pre-assigned to the UE.

7. The method of claim 2,
wherein when the PDU session generated for the UE is plural, determining whether the assignment of the new tracking area to the UE is necessary comprises determining whether the assignment of the new tracking area to the UE is necessary based on a serving area of serving UPFs, associated with all of a plurality of PDU sessions, and the tracking area pre-assigned to the UE.

8. The method of claim 2,
wherein the serving area information is transmitted by the SMF or pre-configured in the AMF for each UPF.

9. The method of claim 8,
wherein when the serving area information is transmitted by the SMF, the serving area information is transmitted by the SMF as PDU session information along with the SSC mode indication information.

10. The method of claim 8, further comprising:
receiving, from the SMF, an address or ID of the serving UPF if the serving area information has been pre-configured in the AMF for each UPF.

11. The method of claim 10,
wherein obtaining the serving area information comprises obtaining serving area information of a UPF corresponding to the address or ID of the serving UPF, among the serving area information pre-configured in the AMF for each UPF.

12. The method of claim 8,
wherein performing the tracking area update further comprises transmitting, to the UE, indication triggering the tracking area update.

13. The method of claim 2,
wherein the SSC mode indication information indicates at least one SSC mode to be applied to the PDU session, among a plurality of pre-defined SSC modes.

14. An access and mobility management function (AMF) assigning a tracking area to a user equipment (UE) in a wireless communication system, the AMF comprising:
a communication module configured to transmit and receive signals; and
a processor functionally connected to the communication module,
wherein the processor is configured to:
control the communication module to receive, from a session management function (SMF), session and service continuity (SSC) mode indication information for a protocol data unit (PDU) session generated for the UE;
obtain serving area information for a serving area of a serving user plane function (UPF) associated with the PDU session;
determine an assignment of a new tracking area to the UE is necessary based on a tracking area pre-assigned to the UE and the serving area; and
perform tracking area update for the assignment of the new tracking area to the UE if it is determined that the assignment of the new tracking area is necessary.

15. The AMF of claim 14,
wherein the processor is configured to:
determine whether the pre-assigned tracking area and the serving area have been aligned by comparing the pre-assigned tracking area and the serving area, if it is determined that the assignment of the new tracking area to the UE is necessary, and
determine that the assignment of the new tracking area is unnecessary if it is determined that the pre-assigned tracking area and the serving area have been aligned, and determine that the assignment of the new tracking area is necessary if it is determined that the pre-assigned tracking area and the serving area have not been aligned.

* * * * *